US012144779B2

(12) United States Patent
Muench et al.

(10) Patent No.: US 12,144,779 B2
(45) **Date of Patent: *Nov. 19, 2024**

(54) SYSTEMS, DEVICES, COMPONENTS AND METHODS FOR TRIGGERING OR INDUCING RESONANCE OR HIGH AMPLITUDE OSCILLATIONS IN A CARDIOVASCULAR SYSTEM OF A PATIENT

(71) Applicant: Vagus Labs, LLC, Hastings-on-Hudson, NY (US)

(72) Inventors: Frederick J. Muench, Brooklyn, NY (US); Steven G. Dean, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,546

(22) Filed: Jul. 7, 2023

(65) Prior Publication Data

US 2024/0180780 A1 Jun. 6, 2024

Related U.S. Application Data

(63) Continuation of application No. 17/228,227, filed on Apr. 12, 2021, now Pat. No. 11,696,868, which is a (Continued)

(51) Int. Cl.
*A61H 31/00* (2006.01)
*A61H 23/02* (2006.01)

(52) U.S. Cl.
CPC .......... *A61H 31/006* (2013.01); *A61H 23/02* (2013.01); *A61H 23/0236* (2013.01);

(Continued)

(58) Field of Classification Search
CPC ........ A61H 1/003; A61H 1/005; A61H 1/006; A61H 23/00; A61H 23/02; A61H 23/0218;

(Continued)

(56) References Cited

U.S. PATENT DOCUMENTS 4,315,502 A 2/1982 Gorges
5,997,482 A 12/1999 Vaschillo et al.

(Continued)

FOREIGN PATENT DOCUMENTS

EP 2222205 9/2010
WO WO 2008131553 4/2008

(Continued)

OTHER PUBLICATIONS

Doucet, B.M., et al., "Neuromuscular Electrical Stimulation for Skeletal Muscle Function", In the Yale Journal of Biology and Medicine, vol. 85, No. 2, Jun. 2012, pp. 201-215.

(Continued)

*Primary Examiner* — Colin W Stuart
*Assistant Examiner* — Douglas Y Sul
(74) *Attorney, Agent, or Firm* — Byrne Poh LLP

(57) ABSTRACT

Various embodiments of systems, devices, components, and methods for providing external therapeutic vibration stimulation to a patient are disclosed and described. Therapeutic vibration stimulation is provided to at least one location on or adjacent to a patient's skin (such as through clothing or a layer disposed next to the patient's skin), and is configured to trigger or induce resonance or high amplitude oscillations in a cardiovascular system of the patient. Inducing such resonance can aid in training autonomic reflexes and improve their functioning.

19 Claims, 19 Drawing Sheets

Related U.S. Application Data continuation of application No. 16/160,688, filed on Oct. 15, 2018, now Pat. No. 10,973,736, which is a continuation of application No. 14/198,312, filed on Mar. 5, 2014, now Pat. No. 10,098,810, which is a continuation-in-part of application No. 13/779,613, filed on Feb. 27, 2013, now Pat. No. 9,943,461.

(60) Provisional application No. 61/604,973, filed on Feb. 29, 2012.

(52) U.S. Cl.
CPC ..... *A61H 23/0245* (2013.01); *A61H 23/0263* (2013.01); *A61H 2201/0107* (2013.01); *A61H 2201/1619* (2013.01); *A61H 2201/1635* (2013.01); *A61H 2201/165* (2013.01); *A61H 2201/5002* (2013.01); *A61H 2201/5005* (2013.01); *A61H 2201/5035* (2013.01); *A61H 2201/5038* (2013.01); *A61H 2201/5097* (2013.01); *A61H 2230/045* (2013.01); *A61H 2230/065* (2013.01); *A61H 2230/425* (2013.01); *A61H 2230/605* (2013.01); *A61H 2230/655* (2013.01)

(58) Field of Classification Search
CPC ............ A61H 23/0236; A61H 23/0245; A61H 23/0263; A61H 23/06; A61H 31/006; A61H 2201/5025; A61H 2201/5005; A61H 2201/5007; A61H 2230/06; A61H 2230/042
See application file for complete search history.

(56) References Cited

U.S. PATENT DOCUMENTS

| | | | | |
|---|---|---|---|---|
| 6,299,632 | B1 | 10/2001 | Jaillet | |
| 6,662,032 | B1 * | 12/2003 | Gavish | A61B 5/4857 600/323 |
| 6,836,681 | B2 | 12/2004 | Stabler et al. | |
| 7,117,032 | B2 | 10/2006 | Childre et al. | |
| 7,163,512 | B1 * | 1/2007 | Childre | A61B 5/02405 600/26 |
| 7,255,672 | B2 | 8/2007 | Elliott | |
| 7,311,658 | B2 | 12/2007 | Elliot | |
| 7,571,002 | B2 | 8/2009 | Thrope et al. | |
| 7,643,875 | B2 | 1/2010 | Heil et al. | |
| 7,713,212 | B2 | 5/2010 | Elliott | |
| D628,304 | S | 11/2010 | Aulwes et al. | |
| 8,002,711 | B2 | 8/2011 | Wood et al. | |
| D652,524 | S | 1/2012 | Messner | |
| 8,219,188 | B2 | 7/2012 | Craig | |
| 8,442,632 | B2 | 5/2013 | Kullock et al. | |
| 9,610,443 | B1 | 4/2017 | Dean et al. | |
| 9,943,461 | B1 | 4/2018 | Muench et al. | |
| 10,098,810 | B1 | 10/2018 | Muench et al. | |
| 10,632,040 | B2 | 4/2020 | Muench et al. | |
| 10,765,884 | B1 | 9/2020 | Dean et al. | |
| 10,973,736 | B2 | 4/2021 | Muench | |
| 2004/0068213 | A1 | 4/2004 | Fujisawa | |
| 2004/0167446 | A1 | 8/2004 | Podrazhansky et al. | |
| 2005/0288601 | A1 | 3/2005 | Wood et al. | |
| 2006/0287605 | A1 | 12/2006 | Lin et al. | |
| 2007/0056582 | A1 | 3/2007 | Wood et al. | |
| 2007/0093732 | A1 | 4/2007 | Venturi et al. | |
| 2007/0299374 | A1 | 12/2007 | Gesotti et al. | |
| 2009/0005713 | A1 * | 1/2009 | Podrazhansky | A61H 23/0236 601/2 |
| 2009/0069728 | A1 * | 3/2009 | Hoffmann | A61B 8/08 601/46 |
| 2009/0076421 | A1 | 3/2009 | Grant | |
| 2010/0320819 | A1 | 12/2010 | Cohen et al. | |
| 2012/0253236 | A1 | 10/2012 | Moe et al. | |
| 2012/0277521 | A1 * | 11/2012 | Chamberlin | A61M 21/02 600/26 |
| 2013/0041296 | A1 * | 2/2013 | Tass | A61H 23/0245 601/46 |
| 2013/0102937 | A1 * | 4/2013 | Ehrenreich | A61H 23/0236 601/47 |
| 2013/0281897 | A1 | 10/2013 | Hoffmann et al. | |
| 2013/0345606 | A1 | 12/2013 | Ehrenreich et al. | |
| 2013/0345608 | A1 | 12/2013 | Ehrenreich et al. | |

FOREIGN PATENT DOCUMENTS

| | | |
|---|---|---|
| WO | WO 2010047834 | 4/2010 |
| WO | WO 2014170880 | 10/2014 |

OTHER PUBLICATIONS

Electromedical Products Int'l Inc., "Alpha-Stim Aid and You", Brochure, 2014, pp. 1-16.

France, C.R., et al., "Blood Pressure and Cerebral Oxygenation Responses to Skeletal Muscle Tension: A Comparison of Two Physical Manueuvers to Prevent Vasovagal Reactions", In Clinical Physiology and Functional Imaging, vol. 26, No. 1, Jan. 2006, pp. 21-25.

Grote, V., et al., "Cardio-Autonomic Control and Wellbeing due to Oscillating Color Light Exposure", In Physiology & Behavior, vol. 114-115, Apr. 10, 2013, pp. 55-64.

Hashmi, J., et al., "Effect of Pulsing in Low-Level Light Therapy", In Lasers Surgery Medicine, vol. 42, No. 6, Aug. 2010, pp. 450-466.

Lehrer, P. and Vaschillo, E., "Heart Rate Variability Biofeedback: A New Tool for Improving Autonomic Homeostasis and Treating Emotional and Psychosomatic Disorders", In Japanese Journal of Biofeedback Research, vol. 30, Oct. 30, 2004, pp. 7-16.

Lehrer, P., et al., "Effects of Rhythmical Muscle Tension at 0.1Hz on Cardiovascular Resonance and the Baroreflex", In Biological Psychology, vol. 81, No. 1, Apr. 2009, pp. 24-30.

Lehrer, P.M., et al., "Biofeedback Training to Increase Heart Rate Variability", In Principles and Practice of Stress Management, 3rd Edition, The Guilford Press, New York, Sep. 30, 2008, pp. 227-248.

Muench, F., "The Portable StressEraser Heart Rate Variability Biofeedback Device: Background and Research", In Biofeedback Magazine, vol. 36, No. 1, 2008, pp. 35-39.

Notice of Allowance dated Jan. 24, 2018 in U.S. Appl. No. 13/779,613, pp. 1-11.

Notice of Allowance dated Jan. 29, 2020 in U.S. Appl. No. 14/948,289, pp. 1-31.

Notice of Allowance dated Feb. 28, 2023 in U.S. Appl. No. 17/228,227, pp. 1-45.

Notice of Allowance dated Jun. 8, 2018 in U.S. Appl. No. 14/198,312, pp. 1-28.

Notice of Allowance dated Dec. 11, 2020 in U.S. Appl. No. 16/160,688, pp. 1-43.

Office Action dated Apr. 6, 2017 in U.S. Appl. No. 14/198,312, pp. 1-38.

Office Action dated Apr. 10, 2017 in U.S. Appl. No. 13/779,613, pp. 1-46.

Office Action dated May 19, 2016 in U.S. Appl. No. 13/779,613, pp. 1-46.

Office Action dated Jun. 14, 2016 in U.S. Appl. No. 14/198,312, pp. 1-35.

Office Action dated Oct. 2, 2015 in U.S. Appl. No. 13/779,613, pp. 1-32.

Office Action dated Oct. 7, 2019 in U.S. Appl. No. 14/948,289, pp. 1-37.

Precision Microdrives, "Product Data Sheet: Pico Vibe 5mm Vibration Motor—11mm Type", Technical Report, Model No. 304-005, 2013, pp. 1-7.

Schipke, J.D., et al., "Effect of Respiration Rate on Short-Term Heart Rate Variability", In Journal of Clinical and Basic Cardiology, vol. 2, No. 1, Jan. 1999, pp. 92-95.

U.S. Appl. No. 13/779,613, filed Feb. 27, 2013, pp. 1-30.

U.S. Appl. No. 14/198,312, filed Mar. 5, 2014, pp. 1-32.

U.S. Appl. No. 14/608,109, filed Jan. 28, 2015, pp. 1-14.

(56) References Cited

OTHER PUBLICATIONS

U.S. Appl. No. 14/608,154, filed Jan. 28, 2015, pp. 1-13.
Vaschillo, E.G., et al., "Characteristics of Resonance in Heart Rate Variability Stimulated by Biofeedback", In Applied Psychophysiology and Biofeedback, vol. 31, No. 2, Jun. 2006, pp. 129-142.
Vaschillo, E.G., et al., "Heart Rate Variability Response to Alcohol, Placebo, and Emotional Picture Cue Challenges: Effects of 0.1 Hz Stimulation", In Psychophysiology, vol. 45, No. 5, Sep. 2008, pp. 847-858.
Vaschillo, E.G., et al., "Resonances in the Cardiovascular System Caused by Rhythmical Muscle Tension", In Psychophysiology, vol. 48, No. 7, Jul. 2011, pp. 927-936.
Vaschillo, E.G., et al., "The Investigation and Clinical Significance of Resonance in the Heart Rate and Vascular Tone Baroreflexes", In Communications in Computer and Information Science, vol. 127, Jan. 2011, pp. 224-237.
Wheat, A.L. and Larkin, K.T., "Biofeedback of Heart Rate Variability and Related Physiology: A Critical Review", In Applied Psychophysiology and Biofeedback, vol. 35, No. 3, May 2010, pp. 229-242.
Zucker, T., et al., "The Effects of Respiratory Sinus Arrhythmia Biofeedback on Heart Rate Variability and Post-traumatic Stress Disorder Symptoms: A Pilot Study", In Applied Psychophysiology and BioFeedback, Jun. 2009, vol. 34, No. 2, pp. 135-143.

* cited by examiner

ON-OFF 10-SECOND CYCLE EXAMPLE

ON-OFF 10-SECOND EXAMPLE

ON-OFF 15-SECOND EXAMPLE

ON-OFF 15-SECOND EXAMPLE

RISING AND FALLING 10-SECOND CYCLE EXAMPLE

SYSTEMS, DEVICES, COMPONENTS AND METHODS FOR TRIGGERING OR INDUCING RESONANCE OR HIGH AMPLITUDE OSCILLATIONS IN A CARDIOVASCULAR SYSTEM OF A PATIENT

CROSS-REFERENCE TO RELATED APPLICATIONS

This application is a continuation of U.S. patent application Ser. No. 17/228,227, filed Apr. 12, 2021, which is a continuation of U.S. patent application Ser. No. 16/160,688, filed Oct. 15, 2018, which is a continuation of U.S. patent application Ser. No. 14/198,312, filed Mar. 5, 2014, which is a continuation-in-part of U.S. patent application Ser. No. 13/779,613, filed Feb. 27, 2013, which claims the benefit of U.S. Provisional Patent Application No. 61/604,973, filed Feb. 29, 2012, each of which is hereby incorporated by reference herein in its entirety.

FIELD OF THE INVENTION

Various embodiments of the invention described herein relate to the field of methods, devices and components for delivering vibration stimulation therapy to a patient.

BACKGROUND

Low or reduced baroreflex sensitivity in patients is associated with numerous problems and disorders (e.g., hypertension, congestive heart failure, coronary heart disease, hypertension, depression, alcohol or drug use disorders and aging). Reduced baroreflex sensitivity in patients blunts the flexibility of the body's self-regulatory system. Contrariwise, high baroreflex sensitivity in patients is generally associated with health and wellness.

What is needed, therefore, are efficacious and cost effective means and methods for increasing baroreflex sensitivity in patients.

Various printed publications, patents and patent applications containing subject matter relating directly or indirectly to the methods, systems, devices and components described below include, but are not limited to, the following:

U.S. Pat. No. 5,997,482 to Vaschillo et al. for "Therapeutic method for a human subject," Dec. 7, 1999.

U.S. Pat. No. 6,836,681 to Stabler et al. for "Method of reducing stress," Dec. 28, 2004.

U.S. Pat. No. 7,117,032 to Childre et al. for "Systems and methods for facilitating physiological coherence using respiration training," Oct. 3, 2006.

U.S. Pat. No. 7,163,512 to Childre et al. for "Method and apparatus for facilitating physiological coherence and autonomic balance," Jan. 16, 2007.

U.S. Pat. No. 7,255,672 to Elliott et al. for "Method of presenting audible and visual cues for synchronizing the breathing . . . ," Aug. 14, 2007.

U.S. Pat. No. 7,713,212 to Elliott et al. for "Method and system for consciously synchronizing the breathing cycle with the natural heart rate cycle," May 11, 2010.

U.S. Pat. No. 8,002,711 to Wood et al. for "Methods and devices for relieving stress," Aug. 23, 2011.

U.S. Pat. No. D628304 to Aulwes for "Massager," Nov. 30, 2010.

U.S. Pat. No. D652524 to Messner for "Massage apparatus," Jan. 17, 2012.

U.S. Provisional Patent Application Ser. No. 61/549,007 to Ehrenreich et al. for "Hypertension and heart rate reduction device" filed Oct. 19, 2011.

U.S. Provisional Patent Application Ser. No. 61/648,060 to Ehrenreich et al. for "Methods and devices for treating hypertension" filed May 16, 2012.

U.S. Provisional Patent Application Ser. No. 61/681,469 to McCrystle et al. for "Methods and devices for treating hypertension using an electroactive transducer" filed Aug. 9, 2012.

U.S. Provisional Patent Application Ser. No. 61/681,513 to von Oepen et al. for "Support assemblies for the treatment of hypertension" filed Aug. 9, 2012.

U.S. Patent Publication No. 2005/0288601 to Wood et al. for "Methods and devices for relieving stress," Dec. 29, 2005.

U.S. Patent Publication No. 2007/0056582 to Wood et al. for "Methods and devices for relieving stress," Mar. 15, 2007.

U.S. Patent Publication No. 2009/0069728 to Hoffman et al. for "Randomic vibration for treatment of blood flow disorders," Mar. 12, 2009.

U.S. Patent Publication No. 2010/0320819 to Cohen et al. for "Chair and system for transmitting sound and vibration," Dec. 23, 2010.

U.S. Patent Publication No. 2012/0253236 to Moe et al. for "Methods and apparatuses for delivering external therapeutic stimulation to animals and humans," Oct. 4, 2012.

U.S. Patent Publication No. 2012/0277521 to Chamberlain for "Systems and methods for eliciting a therapeutic zone," Nov. 1, 2012.

U.S. Patent Publication No. 2013/0102937 to Ehrenreich et al. for "Methods and Devices for Treating Hypertension," Apr. 25, 2013.

U.S. Patent Publication No. 2013/0345606 to Ehrenreich et al. for "Methods and Devices for Treating Hypertension," Dec. 26, 2013.

U.S. Patent Publication No. 2013/0345608 to Ehrenreich et al. for "Methods and Devices for Treating Hypertension," Dec. 26, 2013.

Vaschillo, E. G., Vaschillo, B., Lehrer, P. M. Characteristics of Resonance in Heart Rate Variability Stimulated by Biofeedback. Applied Psychophysiology and Biofeedback. 2006, June; 31(2): 129-142.

Vaschillo, E. G., Vaschillo, B., Buckman, J. F., Pandina, R. J., and Bates, M. E. The Investigation and Clinical Significance of Resonance in the Heart Rate and Vascular Tone Baroreflexes. In BIOSTEC 2010, CCIS 127, A. Fred, J. Filipe, and H. Gamboa (Eds.), pp. 224-237, Springer, Heidelberg.

Vaschillo, E. G., Bates, M. E., Vaschillo, B., Lehrer, P., *Udo*, T., Mun, E. Y., & Ray, S. Heart Rate Variability Response to Alcohol, Placebo, and Emotional Picture Cue Challenges: Effects of 0.1 Hz Stimulation. Psychophysiology. 2008, September; 45(5): 847-858.

Lehrer P, Vaschillo E, Trost Z, France C. Effects of rhythmical muscle tension at 0.1 Hz on cardiovascular resonance and the baroreflex. Biological Psychology. 2009; 81:24.

Schipke J. D. & Arnold G, Pelzer D. Effect of respiration rate on short-term heart rate variability. Journal of Clinical Basic Cardiology. 1999 2: 92.

Wheat, A. & Larkin, K. Biofeedback of Heart Rate Variability and Related Physiology: A Critical Review Applied Psychophysiology and Biofeedback. 2010, 35: 3: 229-242

Zucker, T. L., Samuelson, K. W., Muench, F., Greenberg, M. A., & Gevirtz, R. N. The effects of respiratory sinus arrhythmia biofeedback on heart rate variability and post-traumatic stress disorder symptoms: A pilot study. Applied psychophysiology and biofeedback 2009: 34-2: 135-143.

France C R, France J L, Patterson S M. Blood pressure and cerebral oxygenation responses to skeletal muscle tension: a comparison of two physical maneuvers to prevent vasovagal reactions. Clinical Physiology and Functional Imaging. 2006; 26:21-25.

Vaschillo, E. G., Vaschillo, B., Pandina, R. J. and Bates, M. E. (2011), Resonances in the cardiovascular system caused by rhythmical muscle tension. Psychophysiology, 48: 927-936.

Vaschillo, E. G., Vaschillo, B., Lehrer, P. M. Characteristics of Resonance in Heart Rate Variability Stimulated by Biofeedback. Applied Psychophysiology and Biofeedback. 2006, June; 31(2): 129-142.

Muench F. (2008). The StressEraser portable HRV biofeedback device: background and research. *Biofeedback Magazine,* 36(1), 35-39.

The dates of the foregoing publications may correspond to any one of priority dates, filing dates, publication dates and issue dates. Listing of the above patents and patent applications in this background section is not, and shall not be construed as, an admission by the applicants or their counsel that one or more publications from the above list constitutes prior art in respect of the applicant's various inventions. All printed publications and patents referenced herein are hereby incorporated by referenced herein, each in its respective entirety.

Upon having read and understood the Summary, Detailed Descriptions and Claims set forth below, those skilled in the art will appreciate that at least some of the systems, devices, components and methods disclosed in the printed publications listed herein may be modified advantageously in accordance with the teachings of the various embodiments that are disclosed and described herein.

SUMMARY

In one embodiment, there is provided a method of providing vibration stimulation therapy to a patient comprising delivering at least one vibration signal to at least one location on or adjacent to the patient's skin, the vibration signal being successively delivered to the patient over first periods of time and not being delivered or being delivered at a low amplitude to the patient over second periods of time, the second periods of time being interposed between the first periods of time; wherein the at least one vibration signal within the first and second periods of time are together configured to trigger or induce resonance or high amplitude oscillations in a cardiovascular system of the patient.

In another embodiment, there is provided a method of providing vibration stimulation therapy to a patient comprising delivering first and second vibration signals to at least one location on or adjacent to the patient's skin, the first and second vibration signals corresponding to first and second vibration modes, respectively, the first vibration mode and first vibration signal corresponding to first periods of time, the second vibration mode and second vibration signal corresponding to second periods of time, the second periods of time being interposed between the first periods of time, the first vibration signal being different from the second vibration signal, wherein the first and second vibration signals, first and second vibration modes, and first and second periods of time are together configured to trigger or induce resonance or high amplitude oscillations in a cardiovascular system of the patient.

In yet another embodiment, there is provided a system configured to provide vibration stimulation therapy to a patient comprising a vibration signal generator, a processor operably connected to the vibration signal generator, the processor being configured to drive, or cause to drive, the vibration signal generator in accordance with vibration signal parameters provided to or calculated by the processor, or stored or programmed in a memory forming a portion of or operably connected to the processor, and at least one power source operably connected to the vibration signal generator and the processor, the power source being configured to provide electrical power to the processor and vibration signal generator, wherein the system is configured to deliver at least one vibration signal to at least one location on or adjacent to the patient's skin, through the vibration signal generator, the vibration signal being successively delivered to the patient by the system over first periods of time and not being delivered to the patient by the system over second periods of time, the second periods of time being interposed between the first periods of time, the at least one vibration signal and the first and second periods of time together being configured to trigger or induce resonance or high amplitude oscillations in a cardiovascular system of the patient.

In still a further embodiment, there is provided a system configured to provide vibration stimulation therapy to a patient comprising a vibration signal generator, a processor operably connected to the vibration signal generator, the processor being configured to drive, or cause to drive, the vibration signal generator in accordance with a vibration signal regime transmitted to or received by the processor, or stored or programmed in a memory forming a portion of or operably connected to the processor, and at least one power source operably connected to the vibration signal generator and the processor, the power source being configured to provide electrical power to the processor and vibration signal generator, wherein the system is configured to deliver first and second vibration signals successively to at least one location on or adjacent to the patient's skin, through the vibration signal generator, the first and second vibration signals corresponding to first and second vibration modes, respectively, the first vibration mode and first vibration signal corresponding to first periods of time, the second vibration mode and second vibration signal corresponding to second periods of time, the second periods of time being interposed between the first periods of time, the first vibration signal being different from the second vibration signal, the first and second vibration signals, the first and second vibration modes, and first and second periods of time together being configured to trigger or induce resonance or high amplitude oscillations in a cardiovascular system of the patient.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
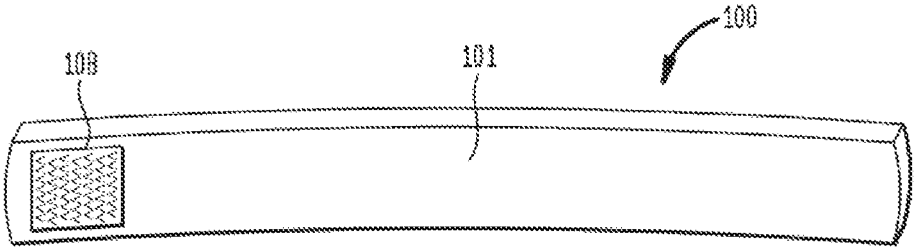
FIGS. 1 through 5 illustrate various embodiments of wearable or portable systems 100 and/or components thereof.

Described herein are various embodiments of vibration stimulation therapy systems, devices, components and methods that are configured to trigger or induce resonance or high amplitude oscillations in a cardiovascular system of the patient.

The arterial baroreflex system (BRS) is a reflexive control system that counteracts acute shifts in blood pressure (BP) by invoking compensatory reactions in cardiovascular functions (e.g., heart rate (HR), vascular tone (VT), and stroke volume (SV)). Baroreceptors trigger simultaneous reflexive reactions in HR, VT, and SV. The BRS regulates short-term BP serving to protect the brain from stroke and the heart from myocardial infarction as well as to restore its inhibition-excitation balance. Low or reduced baroreflex sensitivity is often associated with numerous problems and disorders, such as hypertension, congestive heart failure, coronary heart disease, depression and aging. Reduced baroreflex sensitivity blunts the flexibility of the regulatory system, whereas a high sensitivity is associated with health and wellness.

Similar to engineering closed loop control systems with delays, the closed loop baroreflex system has been discovered to possess resonance properties. That is, there are certain frequencies (known as resonant or resonance frequencies) at which stimulation of the baroreflex system can elicit high amplitude oscillations in HR, BP, SV, and/or VT. The value of the delay in the feedback control system can be used to define one or more resonant frequencies in the closed loop control system. In one such embodiment, the period of the resonant oscillations is equal to the value of two delays. In a closed loop baroreflex system, periodic driving forces at one or more resonant frequencies can produce much larger amplitudes. This is because a baroreflex system is characterized by delays between changes in BP and HR (~5 seconds), as well as between BP and VT (~10-15 seconds), and can have, by way of example, resonance frequencies of ~0.1 Hz and ~0.03 Hz (i.e., periods of resonance oscillation are ~10 s and ~30 s). Each person's baroreflex system has own delays and accordingly own resonance frequencies. These changes can coincide in some fashion with, or can be proportional to, certain resonant frequencies.

Some studies have revealed that interventions such as slow meditative breathing and progressive muscle relaxation performed at or near a patient's resonant frequency can increase oscillations at these frequencies and increase short-term HR baroreflex sensitivity, vagal tone, and/or heart rate variability. This is especially so in healthy individuals and in patients who suffer from cardiovascular or autonomic nervous system disorders. Like many systems, the cardiovascular system has many different functions, and is characterized by several distinct resonant frequencies.

As noted above, according to Vaschillo and colleagues (2010), the baroreflex system in humans can demonstrate resonance properties at frequencies of about 0.1 Hz. In an HR baroreflex closed-loop system, a shift in BP can cause a compensatory HR response that is delayed for approximately 5 seconds. These delays of approximately 5 seconds can in turn coincide with resonance oscillations of about 0.1 Hz (since oscillation periods are equal to twice the value of the delay—e.g., a cycle of about 10 seconds comprised of adjacent 5 second periods). Similarly, the VT baroreflex system in humans can demonstrate resonance properties at frequencies of about 0.03 Hz. In a VT baroreflex closed loop system, the compensatory response of the vasculature is delayed for approximately 10-20 seconds as compared to approximately 5 seconds in the HR baroreflex system. This delay of about 15 seconds coincides with resonance oscillations of about 0.03 Hz (since, again, oscillation periods are equal to twice the value of the delay, e.g., a cycle of about 30 seconds comprised of adjacent 15 second periods).

One mechanism to create or induce resonance in an HR baroreflex system has been through slow paced breathing at an average of about 6 full cycles per minute in which an individual inhales for approximately 4-7 seconds and exhales for approximately 4-7 seconds. Doing so results in individual inhalation-exhalation cycles of about 8-14 seconds. While rates vary according to the individual, breathing at such rates can produce high amplitude oscillations in the HR baroflex system that typically range between about 0.075 Hz and about 0.125 Hz, depending on short-term baroreflex sensitivity and short-term heart rate variability. Long-term practice of such breathing patterns has been linked to an increase in baroreflex sensitivity and HRV at rest. In other words, research has shown that it is possible to cause or induce resonance in the CVS through manipulation of breathing, auditory and visual stimuli, or rhythmical muscle relaxation.

One mechanism to induce resonance in the VT baroreflex system has also been through slow paced breathing at an average of approximately 2-3 full cycles per minute in which an individual inhales for approximately 10-20 seconds and exhales for approximately 10-20 seconds resulting in individual inhalation-exhalation cycles of 20-40 seconds. While rates vary according to the individual, breathing at such rates can produce high amplitude oscillations in the VT baroflex system of about 0.03 Hz, depending among other things on normalization in vascular tone and blood pressure regulation. Similar to the HR baroreflex system, some research has demonstrated that it is possible to cause resonance in the VT baroreflex system cardiovascular system through the manipulation of breathing.

Research directed specifically to the effects of breathing at approximately the foregoing rates has revealed significant potential effects on the CVS, with potential cascading effects on disorders associated with vagal and autonomic dysfunction. Some studies have revealed that paced breathing at a rate of approximately 0.1 Hz can be used effectively in heart rate variability (HRV) biofeedback techniques, as described by Lehrer and Vaschillo (2003). Some studies have also revealed that entraining the CVS and breathing at about 0.1 hz can improve the symptoms of numerous disorders, such as depression, PTSD, fibromyalgia, hypertension, abdominal pain, and coronary heart disease (Vaschillo et al., 2010; Wheat and Larkin, 2010; Zucker et al, 2009). As noted by Vaschillo and colleagues in 2010, "the therapeutic effects of HRV biofeedback are thought to be due to the induction of high-amplitude oscillations in HR, BP, and VT at specific frequencies which exercise and activate homeostatic reflexes (e.g., the baroreflex reflex), retrain them, and initiate, through the baroreceptors, a cascade of neurobiological events that produces a generalized inhibitory effect on the brain."

Other methods to cause high-amplitude oscillation in HR, BP, and VT at specific frequencies may exist, including presenting emotional pictures at a ten second cycle (5 seconds with pictures, 5 seconds without pictures—see Vaschillo et al., 2010), and self-induced rhythmical muscle tension stimulation at the same frequency (France et al., 2006; Lehrer et al., 2009). External or patient-induced stimulation provided at specific frequencies thus may entrain similar frequencies in the CVS through increasing spectral power in the inter-beat interval (RRI), blood pressure (BP) and pulse transit time (PTT). External or patient-induced stimulation may also improve other areas of functioning such as increases in cerebral oxygenation (see, e.g., France, France, & Patterson, 2006). External stimulation through visual pictures or muscle tension exercises might also produce similar clinical effects in the CVS as those produced by breathing biofeedback techniques. Treating diseases associated with cardiovascular dysfunction using external stimulation techniques or patient-induced stimulation, such as hypertension, atrial fibrillation, mental health disorders, depression, post-traumatic stress disorder and substance abuse, may also be possible.

The average stimulation frequency of the HR-baroreflex system is approximately 0.1 Hz (or 6 cycles per minute). Individual differences in the optimal frequency to create resonance in the HR CVS exist, however, and can range between 4 and 7 cycles per minute. These differences have been noted to be a result of differences in blood volume, and can be roughly estimated using height and gender information. Taller individuals and males have longer stimulation rates (e.g. taller individuals have longer total cycles) to create HR resonance. The same is true for VT-baroreflex, where taller individuals require longer total stimulation cycles to create VT resonance.

In addition to creating increased oscillations at the above resonance frequencies which increase dramatically when stimulated, CVS functions may be entrained at other frequencies through breathing at higher or lower rates. Frequencies entrained in the CVS correspond roughly to a total period of one cycle of inhalation and exhalation combined, indicating that the CVS might be entrained using a range of active and/or inactive stimulation cycles. As described above, then, breathing and external stimulation through visual pictures or muscle tension exercises can produce changes in the CVS exhibited through high amplitude oscillations at frequencies that approximately mirror the frequency of breathing, for example.

It has been discovered by us, however, that external stimulation via rhythmical mechanical external vibration can also entrain the CVS to increase oscillations at resonance frequencies or other specific frequencies. This can have profound implications for the treatment of numerous psychiatric and medical disorders, particularly depression and cardiovascular disease, which are often associated with dysregulation in the cardiovascular system and decreased vagal tone. Previous methods to induce resonance or high amplitude oscillations often required active involvement from the patient (e.g., paced breathing or muscle tension). According to one embodiment, there is provided a passive means to stimulate the same reflexes, which can extend the therapeutic effects to a significantly larger population in need.

Resonance or high amplitude oscillations can be induced or created in the CVS by means of a system or device that creates and/or delivers vibration stimulation according to a vibration therapy stimulation regime, which according to some embodiments is predetermined or pre-programmed.

Examples of such vibration regimes for the HR baroreflex system include an 8-14 second cycle (e.g., on for 4-7 seconds and off for 4-7 seconds, or increasing in vibration frequency for 4-7 seconds or decreasing in vibration frequency for 4-7 seconds), a 20-40 second cycle (e.g., 10-20 seconds active or increasing vibration frequency and 10-20 seconds inactive or decreasing vibration frequency). However, there is evidence that one can entrain the CVS at nearly any frequency within the human range to increase specific oscillations in the CVS.

Disclosed and described herein are techniques for entraining frequencies in the CVS to promote human adaptability and responsiveness to internal and environmental perturbations, as well as to promote overall health and wellbeing. Rhythmical mechanical external stimulation of the CVS at specific frequencies can be employed to powerfully impact the CVS. The high amplitude oscillation of cardiovascular functions at resonant frequencies generated by such stimulation can help regulate the CVS, modulate the vagus nerve and the brain, and normalize the inhibition-excitation balance of the CVS on brain systems, and in such a manner provide beneficial therapy to a patient. In some embodiments, the vibration stimulation cycle can entrain the CVS at a frequency or period that mirrors a combined on-off cycle or increasing/decreasing frequency vibration provided by the systems and devices described and disclosed herein.

As noted above, the HR system resonates at about 0.1 Hz and the VT system resonates at approximately 0.03 Hz, although variability between individuals exists necessitating a range of cycle options. In some embodiments, a system or device delivers repeated cycles of mechanical vibration to a patient that vary between 8-14 seconds (4-7 seconds active or increasing vibration frequency for a first period and 4-7 seconds inactive or decreasing vibration frequency for a second period) to stimulate the HR baroreflex system and produces cycles of vibration between 20-40 seconds (10-20 seconds active or increasing vibration frequency for a first period and 10-20 seconds inactive or decreasing vibration frequency for a second period) to stimulate the VT baroreflex system. According to some embodiments, the vibration method and therapy can entrain the CVS using total cycles (the first period and second period adjacent) that range between 8 seconds and 40 seconds. By way of example, a 10 second total cycle can create an increase in CVS oscillations at about 0.1 Hz, a 12 second total cycle can create an increase in CVS oscillations at about 0.08 Hz, a 20 second total cycle can create an increase in CVS oscillations at about 0.05 Hz, and a 40 second total cycle can create an increase in CVS oscillations at about 0.025 Hz. While the goal is to entrain individuals at their approximate resonant frequency (e.g., ~1 Hz), the therapeutic stimulation described and disclosed herein can be used to approximate nearly any CVS frequency ranging between, by way of example, about 0.01 Hz and about 0.4 Hz in any one or more of the HR, BP and VT systems.

The amplitude and frequency of the actual vibration that is provided to the patient (as opposed to the time period or frequency of the overall cycle of the vibration that is provided) can be any suitable frequency or amplitude that is tolerable by the human body. The frequency of the actual vibration signal provided during a cycle can be stable (e.g., 100 Hz for 5 seconds, and then inactive for 5 seconds) or increasing and then decreasing, or decreasing and then increasing. For example, an increase in vibration frequency for 7 seconds (e.g., from 5 Hz to 30 Hz over 7 seconds) followed by a decrease in vibration frequency (e.g., from 30

Hz to 5 Hz over 7 seconds) during a 14 second cycle can be used to create a rhythmical repeating pattern of vibration and stimulation.

Figure 2:
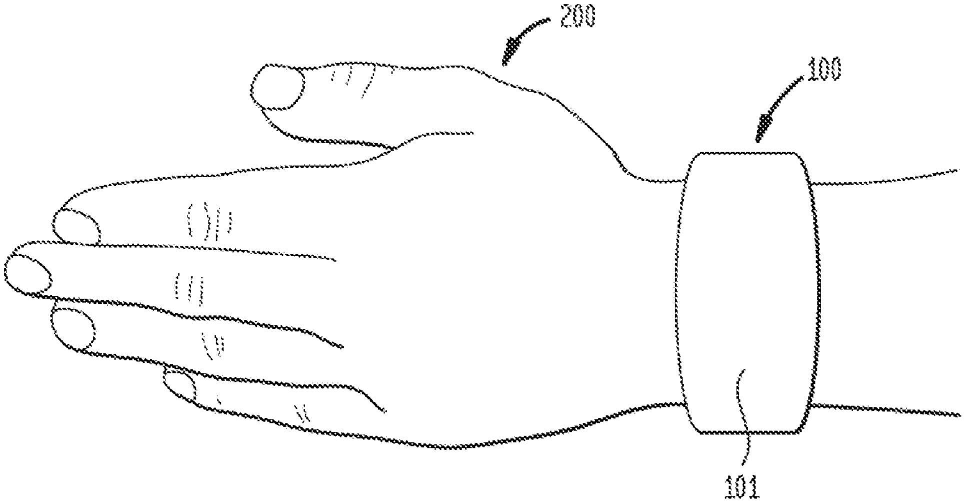
Figure 3:
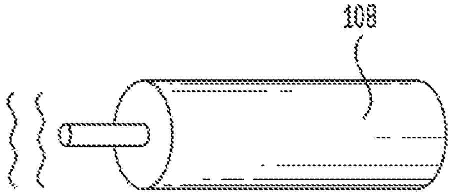

Referring now to FIG. 1, there is shown one embodiment of therapeutic vibration stimulation delivery system 100 comprising wristband 101 and vibration signal generator 108. As shown in FIG. 2, system 100 can be worn on a patient's wrist with vibration signal generator 108 facing inwardly and in contact with the patient's skin. Note that in some embodiments system 100 is configured to deliver the therapeutic vibration signal through a patient's clothing or one or more layers of clothing or material. In FIG. 1, system 100 is a standalone device such as an arm band with an on-off switch that provides vibration signals over a partial cycle 4-20 seconds long, followed by a partial cycle 4-20 seconds long where no or little vibration is provided, thereby entraining the CVS. Wearable band 101 can be an adjustable strap configured to fit multiple areas of the body and extremities (e.g., hands, feet, chest, arms, etc.), as well as multiple body types (e.g., thin, short, medium, tall, and large body types) so that a patient can obtain a good fit. Band 101 can be configured to house vibration signal generator 108, which can be powered by either a disposable or rechargeable battery 120 or other type of power source. According to one embodiment, a vibration motor is included in vibration signal generator 108, and can be charged from within band 101 or be removed therefrom for charging, repair or replacement. FIG. 3 shows one embodiment of such a vibration motor, as described in Product Data Sheet 304-005 of Precision Microdrives dated 2013 which is filed on even date herewith in an Information Disclosure Statement and the entirety of which is hereby incorporated by reference herein.

Figure 4:
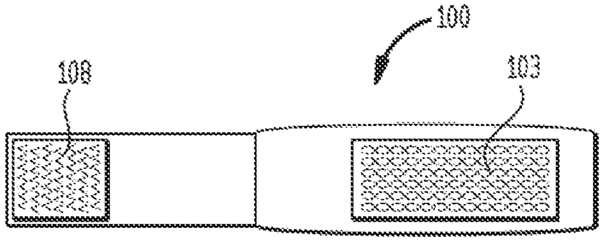
Figure 5:
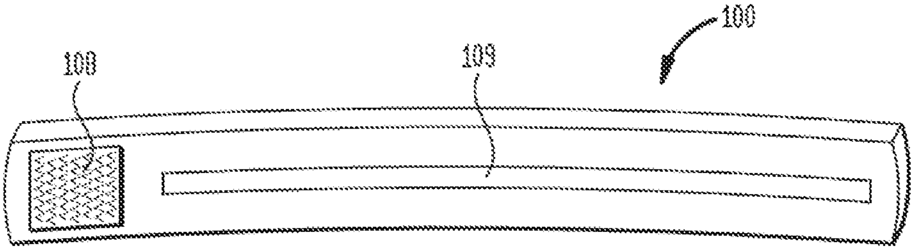

FIGS. 4 and 5 show further embodiments of wearable system 100. In FIG. 4, band 101 further comprises adjustable closure 103 which according to some embodiments may be configured to fit multiple areas of the body and/or extremities. In FIG. 5, filament 109 is disposed along the length or portions of the length of band 101, and is operably connected to signal generator 108 to permit enhanced or better-distributed vibration signals to the patient through band 101.

Referring now to FIGS. 6 through 10, there are shown various examples of therapeutic external mechanical vibration stimulation regimes that can be provided to a patient according to various embodiments of system 100.

Figure 6:
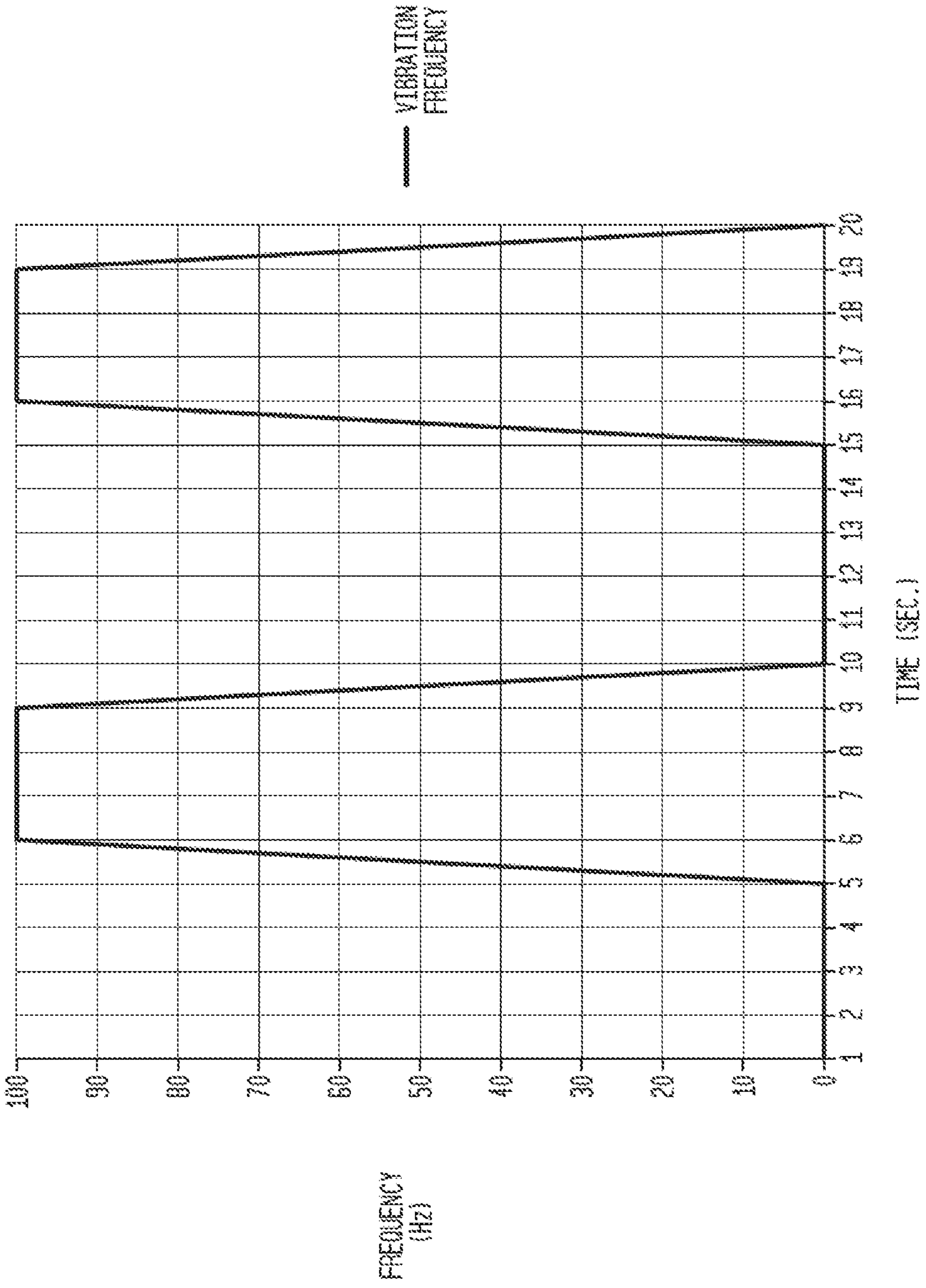
FIGS. 6 through 14 illustrate various examples of vibration stimulation regimes and corresponding methods that can be provided to a patient.

In FIG. 6, there is shown one embodiment of a method of providing therapeutic external mechanical vibration stimulations to a patient, where the overall period or cycle of stimulation is 10 seconds long (see, for example, 5 seconds to 15 seconds along the horizontal axis of FIG. 6), the active or "on" portion of the cycle is 5 seconds long (see, for example, 5 seconds to 10 seconds along the horizontal axis of FIG. 6), and the inactive or "off" portion of the cycle is 5 seconds long (see, for example, 10 seconds to 15 seconds along the horizontal axis of FIG. 6). As further shown in FIG. 6, the frequency at which the actual vibration signal is provided to the patient begins at or near 0 Hz at 5 seconds, ramps up to about 100 Hz at or near 6 seconds, remains constant at about 100 Hz between 6 seconds and 9 seconds, and ramps down from about 100 Hz to about 0 Hz between 9 and 10 seconds. No vibration signal, or a lower amplitude vibration signal, is provided between 10 seconds and 15 seconds. The full 10-second cycle is then repeated beginning at 15 seconds after the inactive period has come to an end. Successive cycles comprising the illustrated active and inactive portions are repeated as long as desired to effect suitable entrainment of the CVS. Successive cycles can also be terminated, adjusted or modified in accordance with physiological parameters of the patient that have been sensed, more about which is said below.

Figure 7:
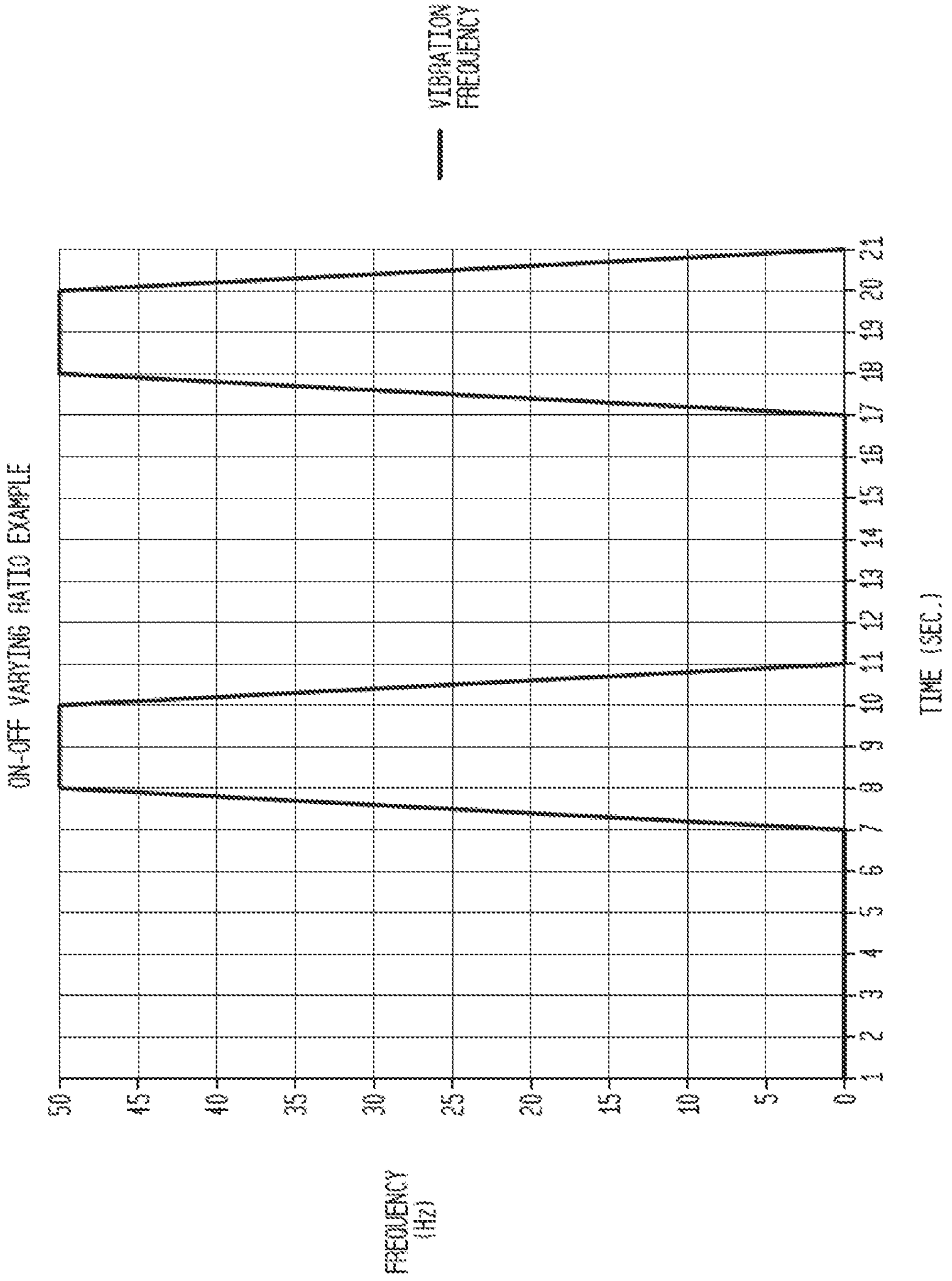

In FIG. 7, there is shown another embodiment of a method of providing therapeutic external mechanical vibration stimulations to a patient, where the overall period or cycle of stimulation is also 10 seconds long (see, for example, 7 seconds to 17 seconds along the horizontal axis of FIG. 7), the active or "on" portion of the cycle is 4 seconds long (see, for example, 7 seconds to 11 seconds along the horizontal axis of FIG. 7), and the inactive or "off" portion of the cycle is 6 seconds long (see, for example, 11 seconds to 17 seconds along the horizontal axis of FIG. 7). As further shown in FIG. 7, the frequency at which the actual vibration signal is provided to the patient begins at or near 0 Hz at 7 seconds, ramps up to about 100 Hz at or near 8 seconds, remains constant at about 100 Hz between 8 seconds and 10 seconds, and ramps down from about 100 Hz to about 0 Hz between 10 and 11 seconds. No vibration signal, or a lower amplitude vibration signal, is provided between 11 seconds and 15 seconds. The full 10-second cycle is then repeated beginning at 15 seconds after the inactive period has come to an end. Successive cycles comprising the illustrated active and inactive portions are repeated as long as desired to effect suitable entrainment of the CVS. Successive cycles can also be terminated, adjusted or modified in accordance with physiological parameters of the patient that have been sensed, more about which is said below.

Figure 8:
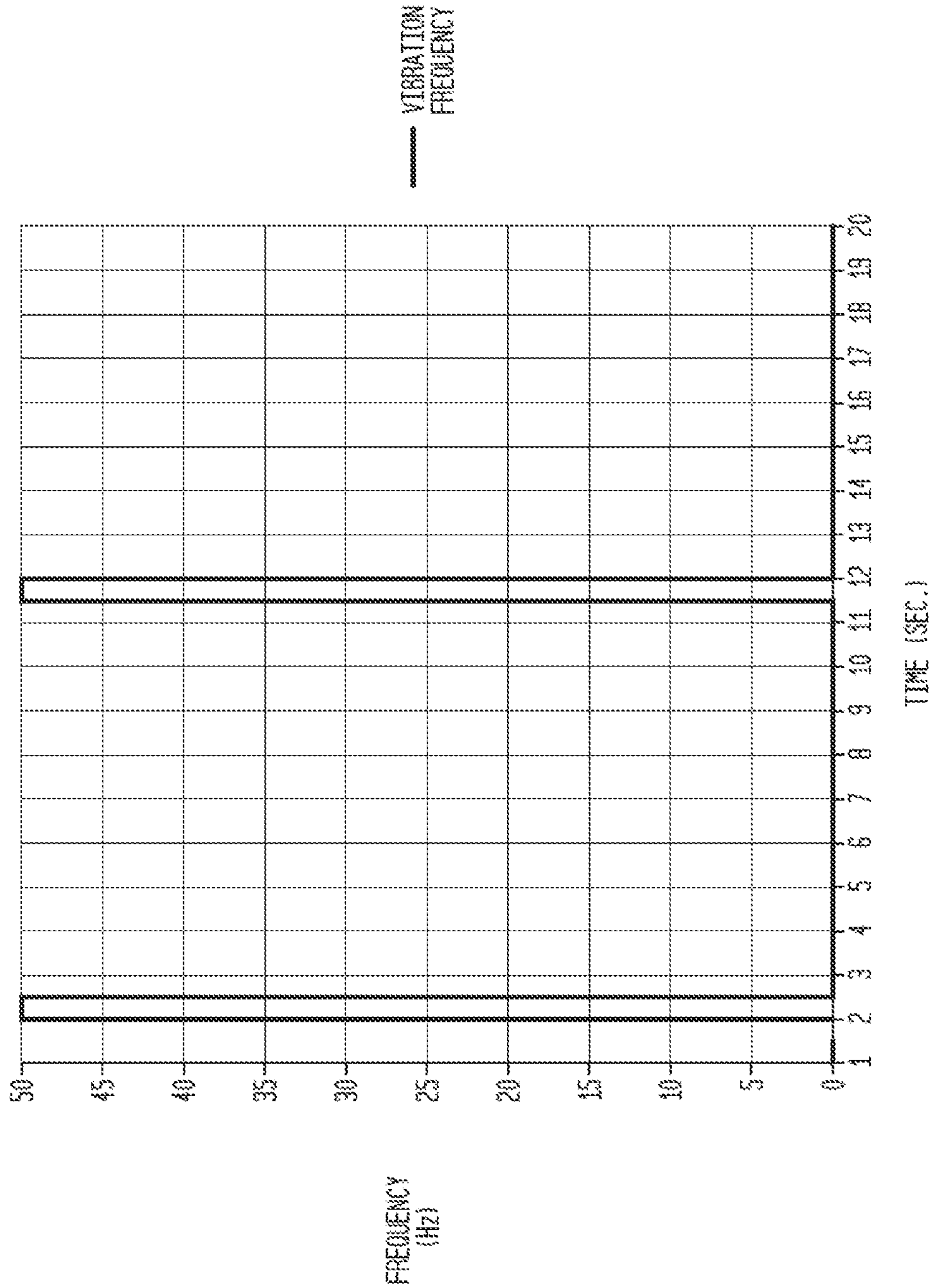

In FIG. 8, there is shown yet another embodiment of a method of providing therapeutic external mechanical vibration stimulations to a patient, where the overall period or cycle of stimulation is also 10 seconds long (see, for example, 2 seconds to 12 seconds along the horizontal axis of FIG. 8), the active or "on" portion of the cycle is 0.5 seconds long (see, for example, 2 seconds to 2.5 seconds along the horizontal axis of FIG. 8), and the inactive or "off" portion of the cycle is 9.5 seconds long (see, for example, 2.5 seconds to 11.5 seconds along the horizontal axis of FIG. 8). As further shown in FIG. 8, the frequency at which the actual vibration signal is provided to the patient begins at or near 0 Hz at 2 seconds, ramps up to or increases to about 50 Hz at or near 2 seconds, remains constant at about 50 Hz between 2 seconds and 2.5 seconds, and ramps down or decreases from about 50 Hz to about 0 Hz at 2.5 seconds. No vibration signal, or a lower amplitude vibration signal, is provided between 2.5 seconds and 11.5 seconds. The full 10-second cycle is then repeated beginning at 11.5 seconds after the inactive or low-amplitude period has come to an end. Successive cycles comprising the illustrated active and inactive or low-amplitude portions are repeated as long as desired to effect suitable entrainment of the CVS. Successive cycles can also be terminated, adjusted or modified in accordance with physiological parameters of the patient that have been sensed, more about which is said below.

Figure 9:
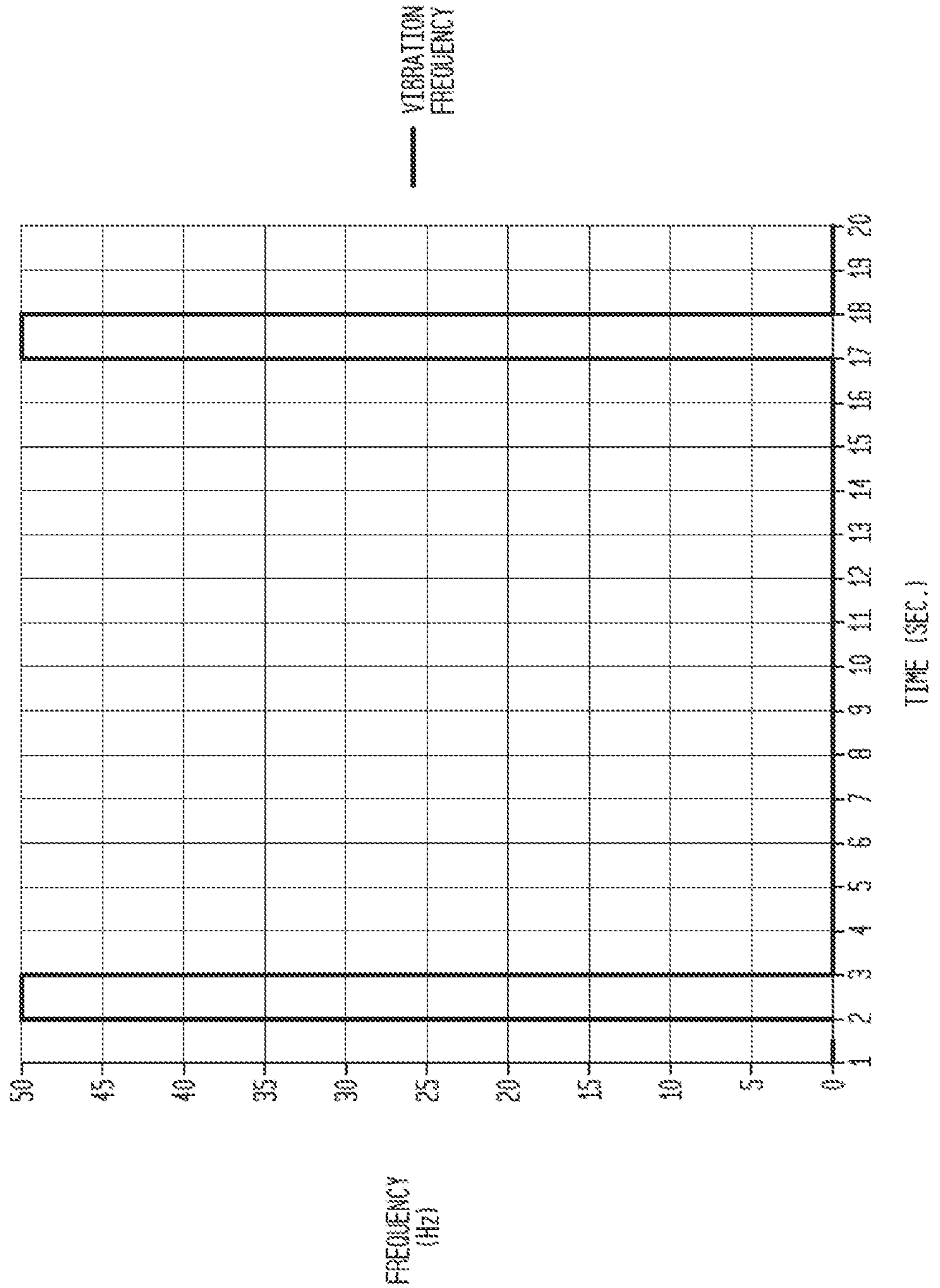

In FIG. 9, there is shown a further embodiment of a method of providing therapeutic external mechanical vibration stimulations to a patient, where the overall period or cycle of stimulation is 15 seconds long (see, for example, 2 seconds to 17 seconds along the horizontal axis of FIG. 9), the active or "on" portion of the cycle is 1.0 seconds long (see, for example, 2 seconds to 3 seconds along the horizontal axis of FIG. 9), and the inactive, "off" or low-amplitude portion of the cycle is 14 seconds long (see, for example, 3 seconds to 17 seconds along the horizontal axis of FIG. 9). As further shown in FIG. 9, the frequency at which the actual vibration signal is provided to the patient begins at or near 0 Hz at 2 seconds, ramps up to or increases to about 50 Hz at or near 2 seconds, remains constant at about 50 Hz between 2 seconds and 3 seconds, and ramps down or decreases from about 50 Hz to about 0 Hz at 3 seconds. No vibration signal, or a lower amplitude vibration signal, is provided between 3 seconds and 17 seconds. The full 15-second cycle is then repeated beginning at 17 seconds after the inactive or low-amplitude period has come to an end. Successive cycles comprising the illustrated active and inactive or low-amplitude portions are repeated as long as desired to effect suitable entrainment of the CVS. Successive cycles can also be terminated, adjusted or modified in accordance with physiological parameters of the patient that have been sensed, more about which is said below.

Figure 10:
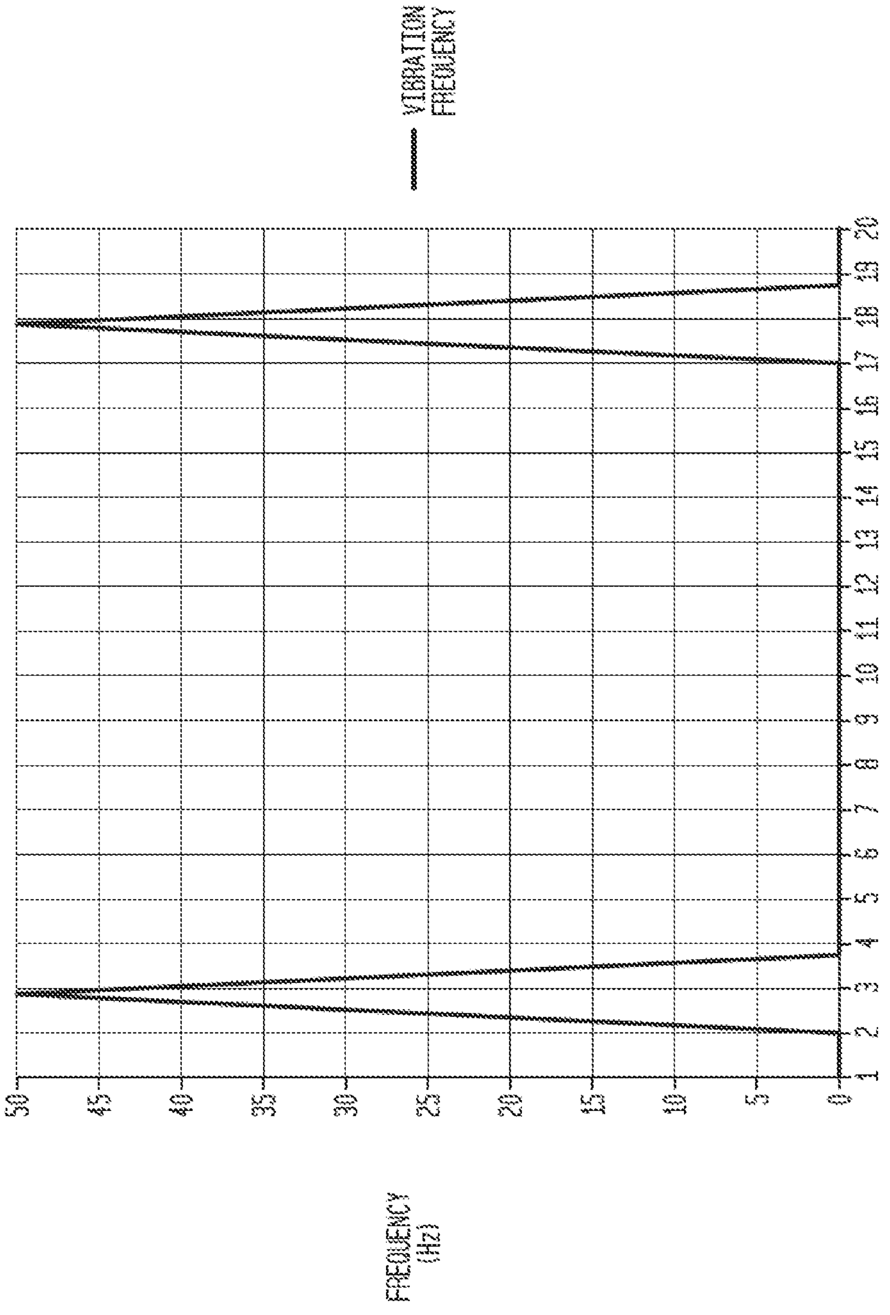

In FIG. 10, there is shown a further embodiment of a method of providing therapeutic external mechanical vibration stimulations to a patient, where the overall period or cycle of stimulation is 15 seconds long (see, for example, 2 seconds to 17 seconds along the horizontal axis of FIG. 10), the active or "on" portion of the cycle is 1.75 seconds long (see, for example, 2 seconds to 3.75 seconds along the horizontal axis of FIG. 10), and the inactive, "off" or low-amplitude portion of the cycle is 13.5 seconds long (see, for example, 3.75 seconds to 17 seconds along the horizontal axis of FIG. 10). As further shown in FIG. 10, the frequency at which the actual vibration signal is provided to the patient begins at or near 0 Hz at 2 seconds, ramps up to or increases to about 50 Hz at or near 2.75 seconds, and then at 2.75 seconds ramps down or decreases from about 50 Hz to about 0 Hz at 3.75 seconds. No vibration signal, or a lower amplitude vibration signal, is provided between 3.75 seconds and 17 seconds. The full 15-second cycle is then repeated beginning at 17 seconds after the inactive or low-amplitude period has come to an end. Successive cycles comprising the illustrated active and inactive or low-amplitude portions are repeated as long as desired to effect suitable entrainment of the CVS. Successive cycles can also be terminated, adjusted or modified in accordance with physiological parameters of the patient that have been sensed, more about which is said below.

FIGS. 6 through 10 illustrate five different embodiments of methods of providing vibration stimulation therapy to a patient, where each of the illustrated methods comprises delivering at least one vibration signal to at least one location on the patient's skin, or through clothing or a layer disposed next to the patient's skin. As shown in FIGS. 6 through 10, the vibration signal is successively delivered to the patient over first periods of time and not delivered, or delivered at low amplitudes, to the patient over second periods of time. The second periods of time are interposed between the first periods of time, and the vibration signal, and the first and second periods of time, are together configured to trigger or induce resonance or high amplitude oscillations in a cardiovascular system of the patient.

Figure 11:
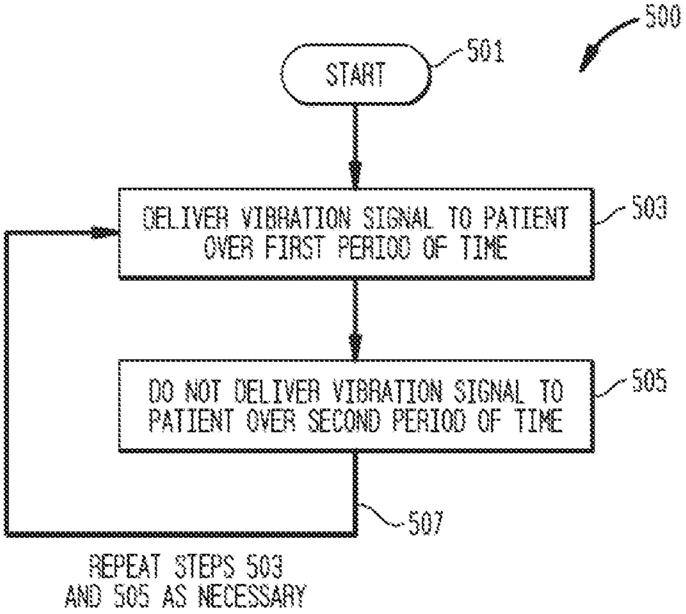

FIG. 11 shows one embodiment of a method 500 for providing therapeutic stimulation to a patient that is consistent with the stimulation patterns illustrated in FIGS. 6 through 10. The method begins at step 501, and proceeds to step 503 where a therapeutic vibration signal is delivered to a patient over a first period of time. Following the first period of time, at step 505 a therapeutic vibration signal is not delivered to the patient over a second period of time. Steps 503 and 505 are repeated via loop 507 as desired, or as required or necessary.

The induced resonance or oscillations are characterized by a third period that approximates the adjacent first and second periods combined, and that represents the above-described overall periods or total cycles. For example, a third period of 12 seconds (e.g. 6 seconds vibration "on" and 6 seconds vibration "off") will entrain the CVS to oscillate at higher amplitudes at approximately 0.08 Hz than would be without the stimulation. This is analogous to breathing in for 6 seconds and out for 6 seconds creating a 12 second period to entrain the CVS at approximately 0.08 Hz. By way of example, such a third period can range between about 4 seconds and 200 seconds, between about 4 and 60 seconds, between about 8 seconds and 40 seconds, between about 4 seconds and 20 seconds, and/or between about 8 seconds and about 14 seconds. Other ranges are contemplated for the third period.

Likewise, various ranges of time are contemplated for the first and second periods of time, which are not intended to be limited by the explicit examples provided herein. For example, the first and/or second periods of time may range between about 0.25 seconds and 100 seconds, between about 0.5 seconds and 100 seconds, between about 1 second and 100 seconds, between about 2 seconds and about 100 seconds, between about 2 seconds and about 30 seconds, between about 4 seconds and about 20 seconds, between about 4 seconds and about 10 seconds, between about 4 seconds and about 7 seconds, or any other suitable range of time. Other ranges are contemplated for the first and second periods.

Also by way of example, the frequency of the vibration signal can range between about 0 or 0.1 Hz and about 2,000 Hz, between about 0, 0.1 or 1 Hz and about 250 Hz, between about 5 or 10 Hz and about 125 Hz, between about 25 Hz and about 125 Hz. Other ranges of frequencies are also contemplated.

Continuing to refer to FIGS. 6 through 10, the first periods of time are shown as being adjacent to the second periods of time. According to some embodiments, other or further periods of time may be interposed between the first and second periods of time. The amplitude of the vibration signal may also be held is approximately constant over at least major portions of the first and/or second periods of time. As further shown in FIGS. 6 through 10, the frequency of the vibration signal may be varied over the first periods of time. For example, the frequency of the vibration signal may increase near the beginning of the first period of time and decrease near the end of the first period of time, and the first periods of time can be configured to correspond to an "on" mode while the vibration signal is being delivered to the patient, and the second periods of time can be configured to correspond to an "off" mode while the vibration signal is not being delivered to the patient.

Furthermore, and continuing to refer to FIGS. 6 through 10, the method can additionally comprise sensing a physiological parameter of the patient and, in response to such sensing, adjusting at least one of the frequency, amplitude or phase of the vibration signal, and/or adjusting at least one of the first and second periods of time over the which the vibration signal is being provided or is not being provided to the patient. For example, the method can additionally comprise sensing a physiological parameter of the patient and, in response to such sensing, changing the length of at least one of the first period and the second period, terminating delivery of the vibration signal to the patient, and initiating delivery of the vibration signal to the patient.

The resonance or high amplitude oscillations induced or created by the methods described and disclosed herein may be used to treat a patient for a stress-related disorder, depression, hypertension, an autonomic dysfunction, atrial fibrillation, coronary heart disease, diabetes, post-traumatic stress disorder, substance abuse, and yet other disorders, maladies or diseases. Such induced or created resonance, or forced oscillations, can also be employed to increase a patient's baroreflexes, increase the flexibility of a patient's CVS, and/or increase or improve a patient's vagal nerve tone and/or stress reactivity.

Figure 12:
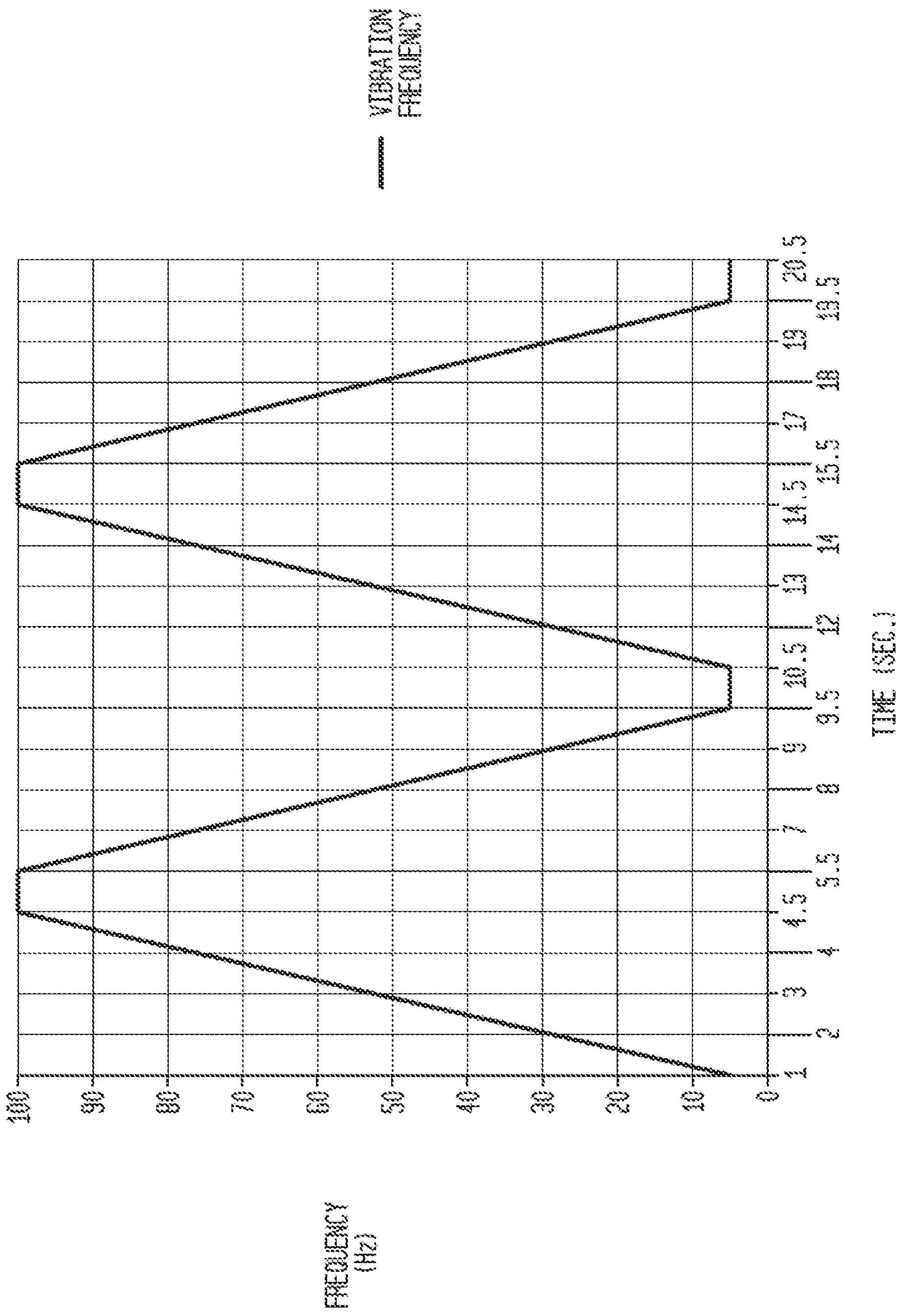

In FIG. 12, there is shown yet another embodiment of a method of providing therapeutic external mechanical vibration stimulation to a patient, where the overall third period or cycle of stimulation is 10 seconds long (see, for example, 9.5 seconds to 19.5 seconds along the horizontal axis of FIG. 12), a first portion of the cycle is about 5 seconds long (see, for example, approximately 9.5 seconds to 14.5 seconds along the horizontal axis of FIG. 12), and a second portion of the cycle is about 5 seconds long (see, for example, approximately 14.5 seconds to 19.5 seconds along the horizontal axis of FIG. 12). As further shown in FIG. 12, the frequency at which the actual vibration signal is provided to the patient during the first portion of the cycle is at about 5 Hz at about 9.5 seconds, ramps up to 100 Hz at 14.5 seconds, is stable between 14.5 and 15.5 seconds, and then ramps down from 100 Hz to 5 Hz between 15.5 and 19.5 seconds. In this embodiment, the lowest vibration frequency vibration is about 5 Hz. The full 10 second cycle is then repeated beginning at about 19.5 seconds. As shown, the full cycle of 10 seconds can include stable, increasing or decreasing frequencies within each cycle. Successive cycles comprising the illustrated first and second periods are repeated as long as desired to effect suitable entrainment of the CVS. Successive cycles can also be terminated, adjusted or modified in accordance with physiological parameters of the patient that have been sensed, more about which is said below.

Figure 13:
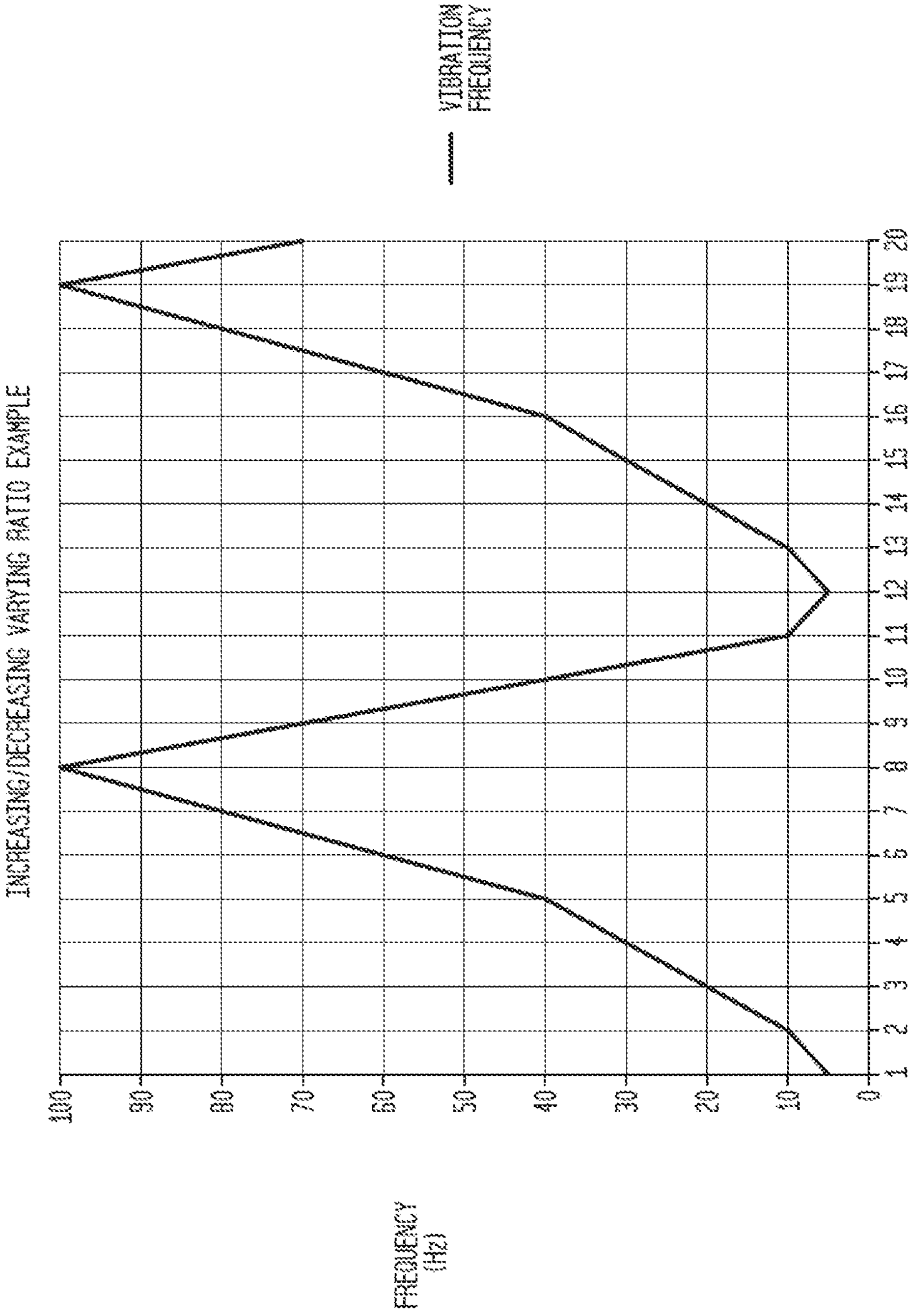

In FIG. 13, there is shown a further embodiment of a method of providing therapeutic external mechanical vibration stimulation to a patient, where the overall period or cycle of stimulation is 11 seconds long (see, for example, 1 second to 12 seconds along the horizontal axis of FIG. 13), first slowly-ramping portions of the cycle are each 1 second long (see, for example, 1 second to 2 seconds, and 11 seconds to 12 seconds, along the horizontal axis of FIG. 13), and second more quickly ramping portions of the cycle are 6 seconds long (see, for example, 2 seconds to 8 seconds along the horizontal axis of FIG. 10, and 8 seconds to 11 seconds along the horizontal axis of FIG. 13). As further shown in FIG. 10, the frequency at which the actual vibration signal is provided to the patient during the first portions of the cycle range between about 5 Hz and about 10 Hz, and then ramp up to 100 Hz at or near 8 seconds, and then ramp down to 10 Hz at or near 11 seconds. As shown in FIG. 13, the frequency of the provided vibration signal varies throughout the cycle. The full 11 second cycle is then repeated beginning at 12 seconds after the last first portion of the cycle has been completed.

Successive cycles comprising the illustrated first and second portions may then be repeated as long as desired to effect suitable entrainment of the CVS. Successive cycles can also be terminated, adjusted or modified in accordance with physiological parameters of the patient that have been sensed, more about which is said below.

FIGS. 12 and 13 illustrate two embodiments of methods of providing vibration stimulation therapy to a patient, where each of the illustrated methods comprises delivering first and second vibration signals to at least one location on the patient's skin, or through clothing or a layer disposed next to the patient's skin, the first and second vibration signals corresponding to first and second vibration modes, respectively. As shown in FIGS. 12 and 13, the first vibration mode and first vibration signal correspond to first periods of time, while the second vibration mode and second vibration signal correspond to second periods of time. As further shown in FIGS. 12 and 13, the second periods of time are interposed between the first periods of time, and the first vibration signal is different from the second vibration signal. The first and second vibration signals, first and second vibration modes, and first and second periods of time are together configured to trigger or induce resonance or high amplitude oscillations in a cardiovascular system of the patient.

Figure 14:
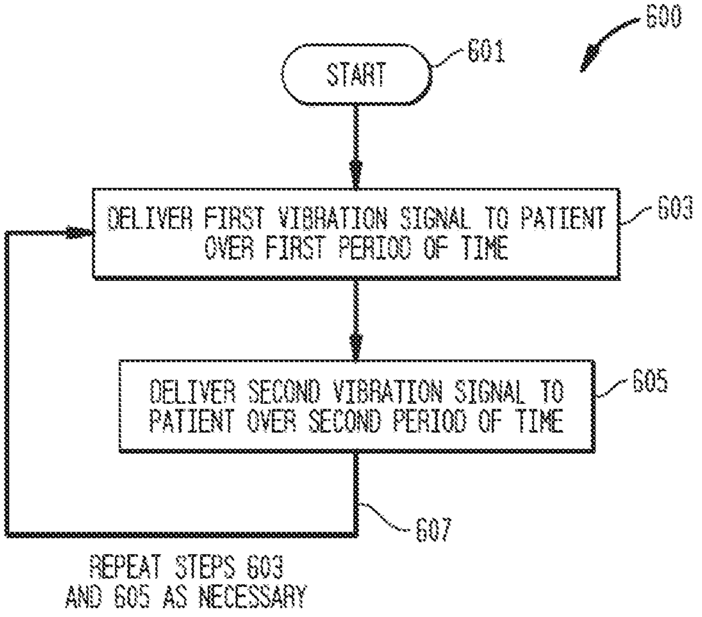

FIG. 14 shows one embodiment of a method 600 for providing therapeutic stimulation to a patient that is consistent with the stimulation patterns illustrated in FIGS. 12 and 13. The method begins at step 601, and proceeds to step 603 where a first therapeutic vibration signal is delivered to a patient over a first period of time. Following the first period of time, at step 605 a second therapeutic vibration signal is delivered to the patient over a second period of time. Steps 603 and 605 are repeated via loop 607 as desired, or as required or necessary.

According to some embodiments, and continuing to refer to FIGS. 12 and 13, the induced resonance or oscillations are characterized by a third period that approximates the adjacent first and second periods combined, and that represents the above-described overall periods or cycles. For example, a third period of 40 seconds (e.g., 20 seconds with vibration "increasing" and 20 seconds with vibration "decreasing") will entrain the CVS to oscillate at higher amplitudes of approximately 0.025 Hz than would be the case without such stimulation. By way of example, such a third period can range between about 4 seconds and 200 seconds, between about 4 and 60 seconds, between about 8 seconds and 40 seconds, between about 4 seconds and 20 seconds, and/or between about 8 seconds and about 14 seconds. Other ranges are contemplated for the third period.

Likewise, various ranges of time are contemplated for the first and second periods of time illustrated in FIGS. 12 and 13, which are not intended to be limited by the explicit examples provided herein. For example, the first and/or second periods of time may range between about 0.25 seconds and 100 seconds, between about 0.5 seconds and 100 seconds, between about 1 second and 100 seconds, between about 1 second and about 100 seconds, between about 2 seconds and about 30 seconds, between about 4 seconds and about 20 seconds, between about 4 seconds and about 15 seconds, between about 4 seconds and about 10 seconds, between about 2 seconds and about 30 seconds, between about 3 seconds and about 20 seconds, or any other suitable range of time. Also by way of example, the frequency of the vibration signals shown in FIGS. 9 and 10 can range between about 0 or 0.1 Hz and about 2,000 Hz, between about 0, 0.1 or 1 Hz and about 250 Hz, between about 1 Hz and about 200 Hz, between about 5 Hz or about 10 Hz and about 125 Hz, and between about 25 Hz and about 125 Hz.

Continuing to refer to FIGS. 12 and 13, the first periods of time are shown as being adjacent to the second periods of time. According to some embodiments, other or further periods of time may be interposed between the first and second periods of time. The amplitude of the vibration signal may also be held is approximately constant over at least major portions of the first and/or second periods of time. As further shown in FIGS. 12 and 13, the frequency of the vibration signal may be varied over either the first period of time, the second period of time, or both of the first and second periods of time. For example, and as illustrated in FIGS. 12 and 13, the frequency of the vibration signal may increase near the beginning of the first period of time and decrease near the end of the first period of time, and the first periods of time can be configured to correspond to an "on" mode while the vibration signal is being delivered to the patient, and the second periods of time can be configured to correspond to a lower frequency or different frequency regime.

Furthermore, and continuing to refer to FIGS. 12 and 13, the method can additionally comprise sensing a physiological parameter of the patient and, in response to such sensing, adjusting at least one of the frequency, amplitude or phase of the vibration signal, and/or adjusting at least one of the first and second periods of time over the which the vibration signal is being provided or is not being provided to the patient. For example, the method can additionally comprise sensing a physiological parameter of the patient and, in response to such sensing, changing the length of at least one of the first period and the second period, terminating delivery of the vibration signal to the patient, and initiating delivery of the vibration signal to the patient.

As with respect to the methods illustrated in FIGS. 6 through 10, the resonance or high amplitude oscillations induced or created by the methods illustrated in FIGS. 12 and 13 may be used to treat a patient for a stress-related disorder, depression, hypertension, an autonomic dysfunction, atrial fibrillation, coronary heart disease, diabetes, post-traumatic stress disorder, substance abuse, and yet other disorders, maladies or diseases. Such induced or created resonance or oscillations can also be employed to increase a patient's baroreflexes, increase the flexibility of a patient's CVS, and/or increase or improve a patient's vagal nerve tone and/or stress reactivity.

Referring now to FIGS. 6 through 14, it is to be noted that ratios of the first period and the second period may be varied in any suitable manner, or may be fixed in any suitable manner. For example, the on-off stimulation ratios shown in FIGS. 6 through 10, or the increasing/decreasing ratios of FIGS. 12 and 13, can vary between or within each total cycle. According to one embodiment, for example, a 10 second cycle can comprise active stable or increasing vibration frequencies over 5 seconds, and inactive or decreasing frequencies over 5 seconds resulting in a 1:1 ratio of the first and second periods. Other ratios are contemplated. Those skilled in the art will now, after having read and understood the specification and drawings of the present patent application, that virtually infinite number of permutations, combinations, and modifications may be made the vibration stimulation regimes described and disclosed herein, and to the periods, frequencies, amplitudes, phases, waveform morphologies, and other characteristics of the delivered vibration signals while providing efficacious treatment to a patient.

Figure 15:
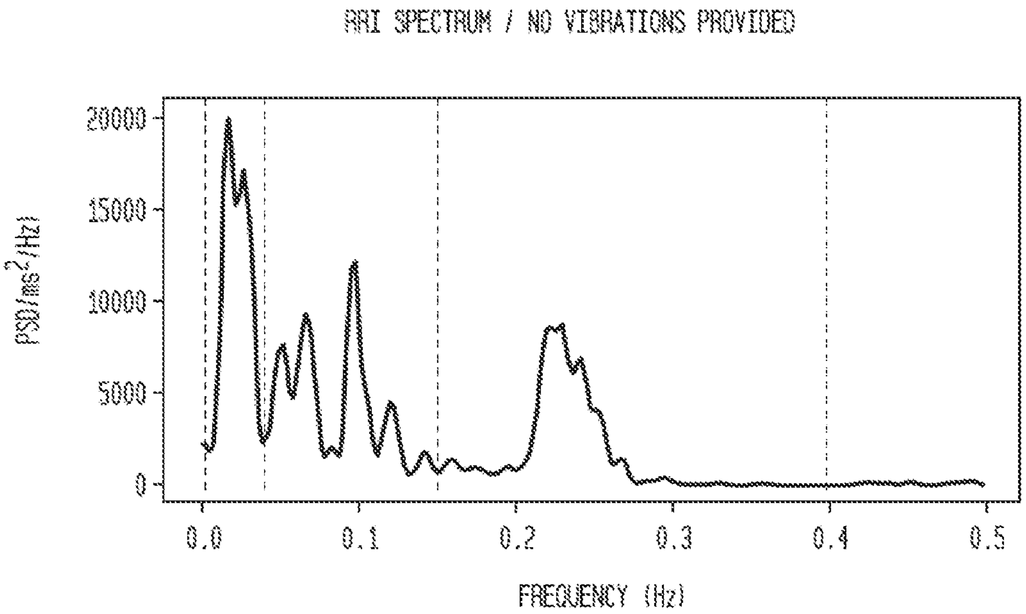
FIGS. 15 through 18 show results obtained with a test subject.
Figure 16:
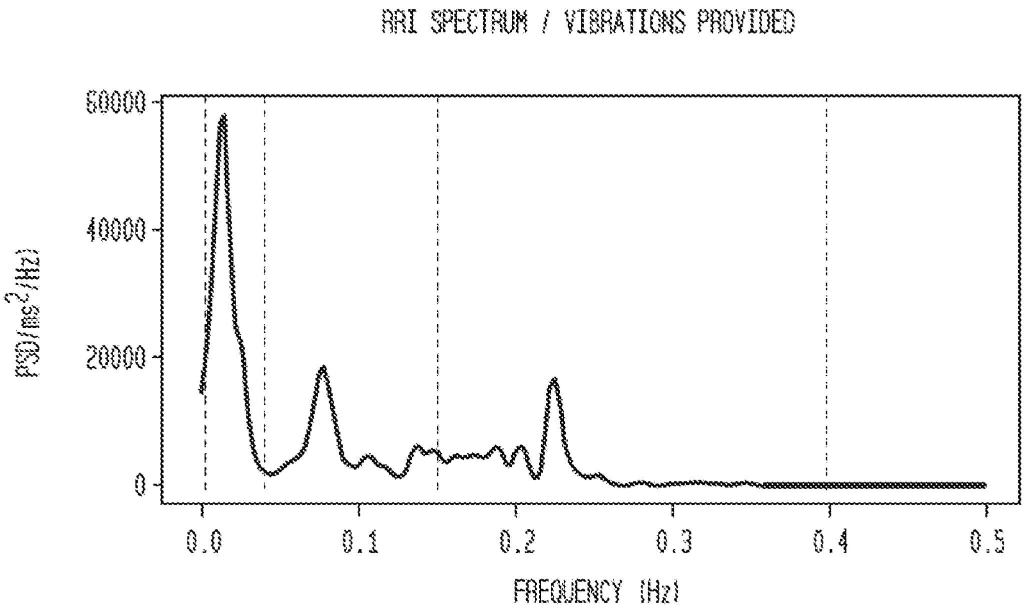

We turn now to FIGS. 15 through 18, where there are illustrated the results of testing on a patient one embodiment of the methods, systems and devices described herein. FIG. 15 shows cardiac power spectrum density ("PSD") consecutive R-wave to R-wave interval ("RRI") data acquired from a seated 47-year-old test subject while no therapeutic vibration stimulation therapy was being delivered to the test subject ("no vibrations provided"). FIG. 16 shows cardiac PSD RRI data acquired from the same test subject while therapeutic vibration stimulation therapy was being delivered to the test subject ("vibrations provided").

The vibration stimulation provided to the test subject while the data of FIG. 16 were being acquired comprised six-second first periods of time, where active external vibration signals increasing in frequency were provided to the test subject followed by six-second second periods of time where active external vibration signals decreasing in frequency were provided to the test subject, thus resulting in 12 second combined or third periods of time. The baseline period employed was 5 minutes of no stimulation (FIG. 15). The vibration intervention period of continuous 12 second cycles lasted 5 minutes (FIG. 16). A 12-second cycle was selected specifically to highlight that the system disclosed and described herein is capable of shifting oscillations in the CVS to a different frequency and increase high amplitude oscillations at that frequency.

Once the subject was seated, and before monitoring or vibration signals were provided, various sensors were connected to the test subject, including cardiac heart rate and blood pressure sensors so that in addition to RRI, heart rate variability ("HRV" or beat-to-beat heart rate) and blood pressure variability ("BPV" or beat-to-beat blood pressure) could be measured. When the vibration signals were provided to the subject, the vibration signals were increased in frequency from approximately 5 Hz to 30 Hz over the first period of 6 seconds, and during the second period of 6 seconds were decreased in frequency from 30 Hz to 5 Hz (FIG. 16), and the process repeated successively over a 5-minute period of time. During periods of no stimulation (FIG. 15), no vibration signals were provided to the patient.

During the experiments, a computer based microcontroller (ARDUINO) was used to send an intermittent PWM (pulse width modulation) signal to a vibration motor, which was operated at 1.5 volts with 4.6 mm of displacement and an acceleration of 0.5 Gs. This allowed the intensity as well as the frequency of vibration pulses to be controlled by changing the electrical current provided to the motor.

Comparison of FIGS. 15 and 16 shows that the vibrations provided to the test subject resulted in forced high amplitude oscillations and entrainment of the subject's CVS at approximately 0.08 Hz. Comparison of FIG. 15 to FIG. 16 shows that RRI PSD amplitude at 0.078 Hz increased from 12, 161 $ms^2$/Hz in FIG. 13 to 18,557 $ms^2$/Hz when the vibration signal generator was placed around the subject's wrist, and to 20,750 $ms^2$/Hz when placed on subject's neck, which indicates that vibration stimulation indeed entrained the HR rhythms of the subject's CVS. Continuing to refer to FIGS. 13 and 14, decreased peaks in other frequencies resulted in a smoothed wave form with distinct peaks at approximately the same period as the stimulation frequency.

Figure 17:
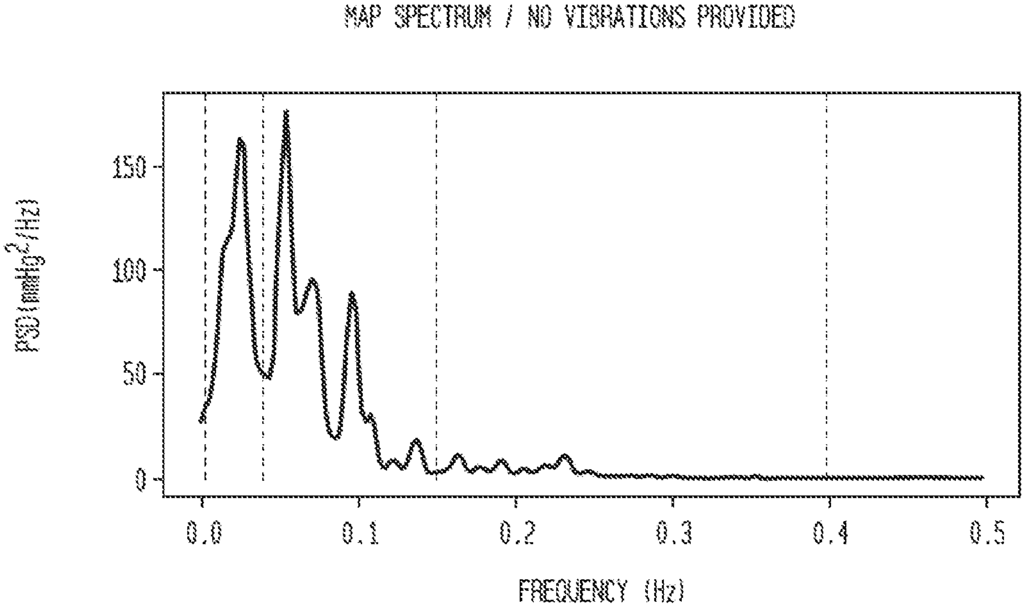
Figure 18:
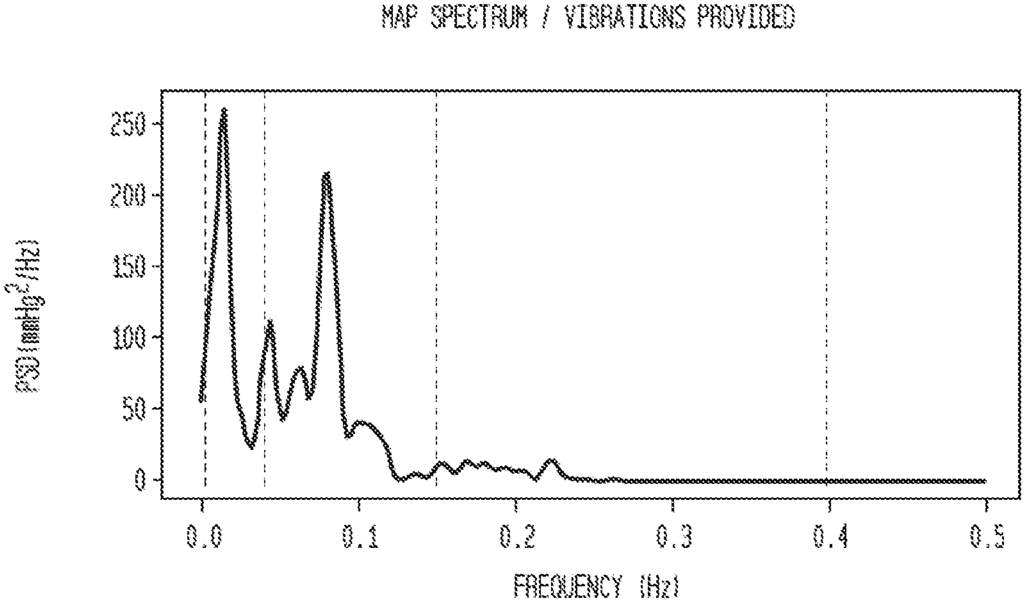

FIGS. 17 and 18 show results obtained from the same test subject when mean arterial pressure ("MAP") was measured without vibration signals being provided to the subject (FIG. 17), and with the same vibration signals being provided to the subject (FIG. 18) as described above with respect to FIG. 16. FIGS. 17 and 18 show that MAP PSD amplitude at 0.078 Hz increased from 88.8 $ms^2$/Hz to 215 $ms^2$/Hz when the vibration signal generator was placed around the wrist of the subject, and to 259 $ms^2$/Hz when the vibration signal generator was placed on the neck of the subject, which indicates that vibration stimulation did indeed entrain the blood pressure rhythms of the subject's CVS. Decreased peaks in other frequencies resulted in a smoothed waveform with distinct peaks, as shown in FIG. 18.

Figure 19:
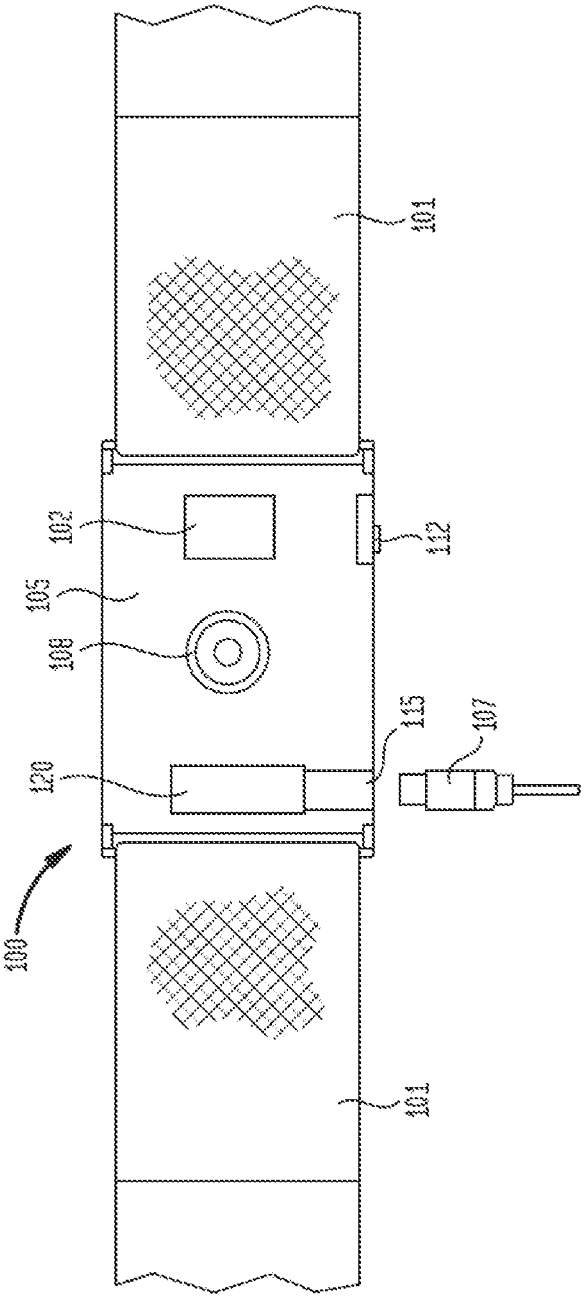
FIGS. 19 through 24 illustrate various embodiments of systems and devices for delivering therapeutic vibration stimulation to a patient.

FIG. 19 shows a top view of one wearable or portable embodiment of a system 100, which comprises band 101, vibration device 105 having vibration signal generator 108 attached or affixed thereto or therein, processor, microprocessor, ASIC, controller, CPU or computer 102, on/off switch or user input 112, primary or rechargeable battery or power source 120, and USB port 115. USB cable 107 can be attached to device 105 by a user to charge power source 120. CPU 102 preferably comprises at least one memory for storing one or more programs that are configured to permit CPU 102 to control, activate, and deactivate vibration signal generator 108 in accordance with one or more vibration signal regimes. Such programs may be loaded or stored in a non-volatile memory of CPU 102, either when the CPU is manufactured, or by downloading appropriate instructions, programs or applications to device 105 form an external source, such as a computer or the internet. Vibration signal generator 108 can be any one of a motor, an ultrasound generator, a speaker, an electromechanical transducer or solenoid, a piezoelectric element or array of piezoelectric elements, or any other device that is capable of generating vibration signals that can then be provided to a patient. According to some embodiments, device 105 may be a stand-alone vibration therapy device, or may be incorporated into a watch, a heart rate monitor, a mobile phone, or any other suitable portable electronic device.

Figure 20:
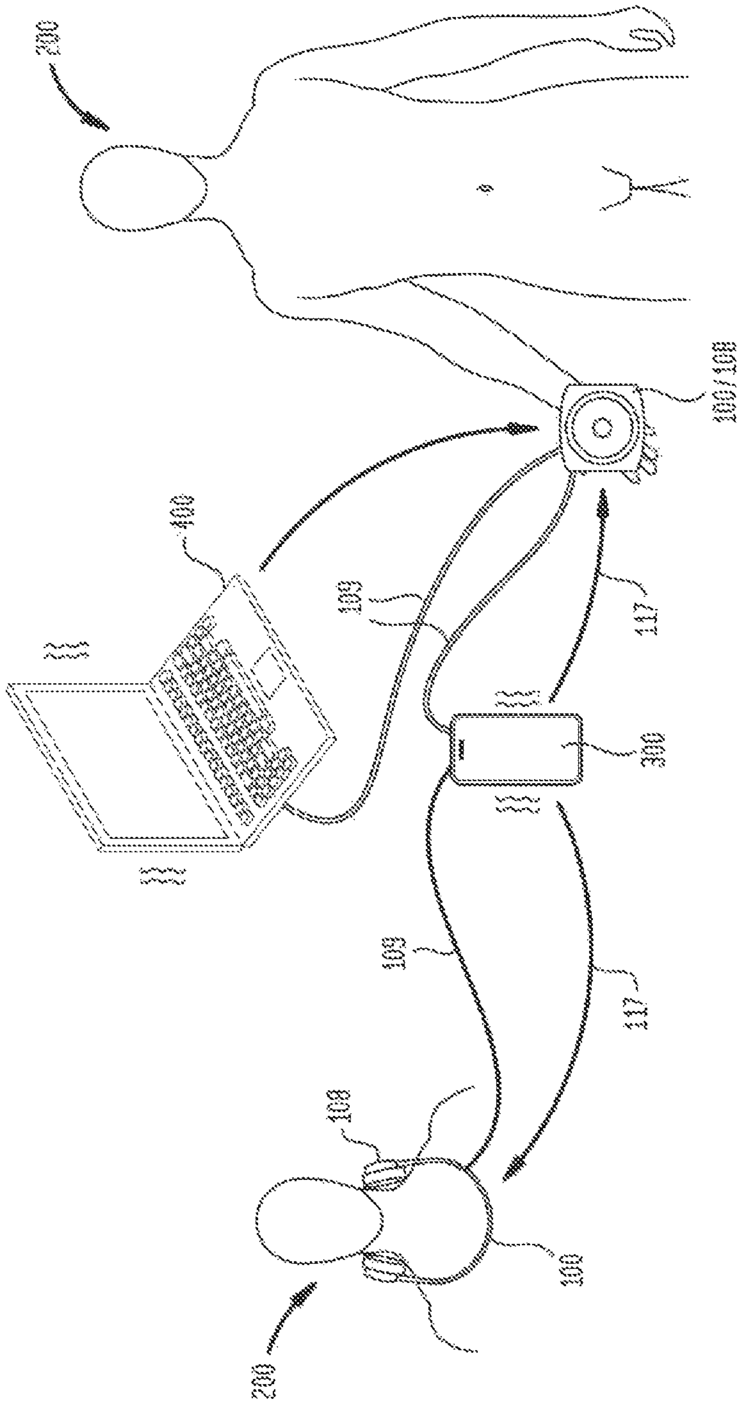

FIG. 20 shows various embodiments of systems 100 and corresponding vibration signal generators 108 that can be configured for wired use in conjunction with laptop or other computer 400, or in conjunction with mobile electronic device 300, which according to some embodiments can be a mobile phone or iPhone. Laptop or other computer 400, or mobile electronic device 300, is appropriately programmed with a suitable program or application to provide the desired vibration signal regime to headphones or ear buds 200, or speakers 108, either of which may serve as the vibration signal generator.

Figure 21:
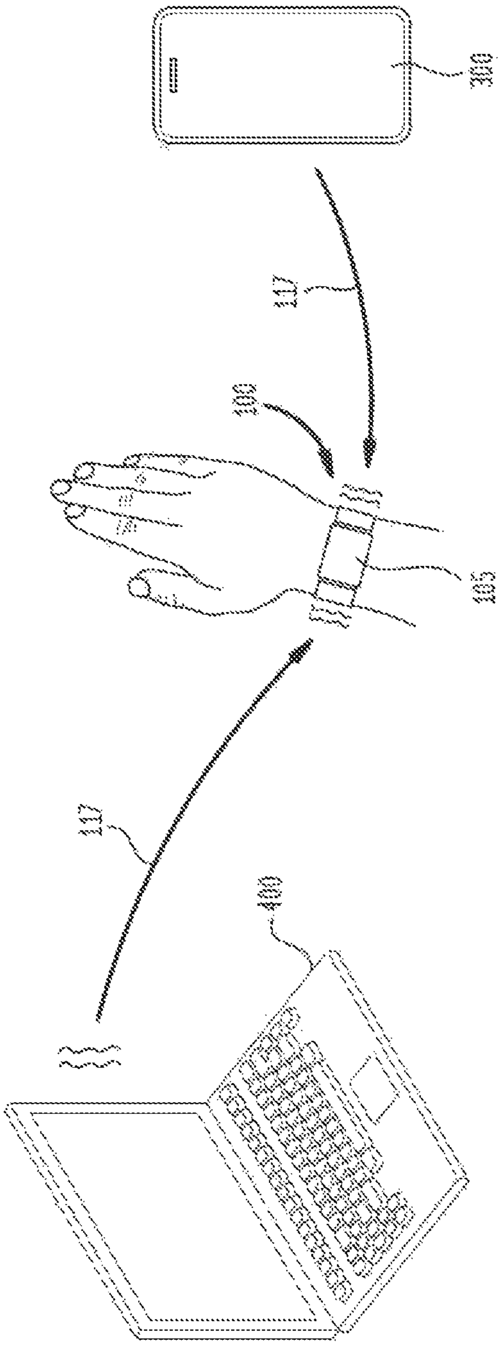

FIG. 21 shows various embodiments of system 100 and corresponding laptop or other computer 400, or mobile electronic device 300, where computer 400 or mobile electronic device 300 is configured to communicate wirelessly with device 105 and thereby effect provision of a desired vibration signal regime to a patient. Laptop or other computer 400, or mobile electronic device 300, is appropriately programmed with a suitable program or application to provide the desired vibration signal regime to the patient, or to modify a program operating or loaded in the CPU of device 105.

Figure 22:
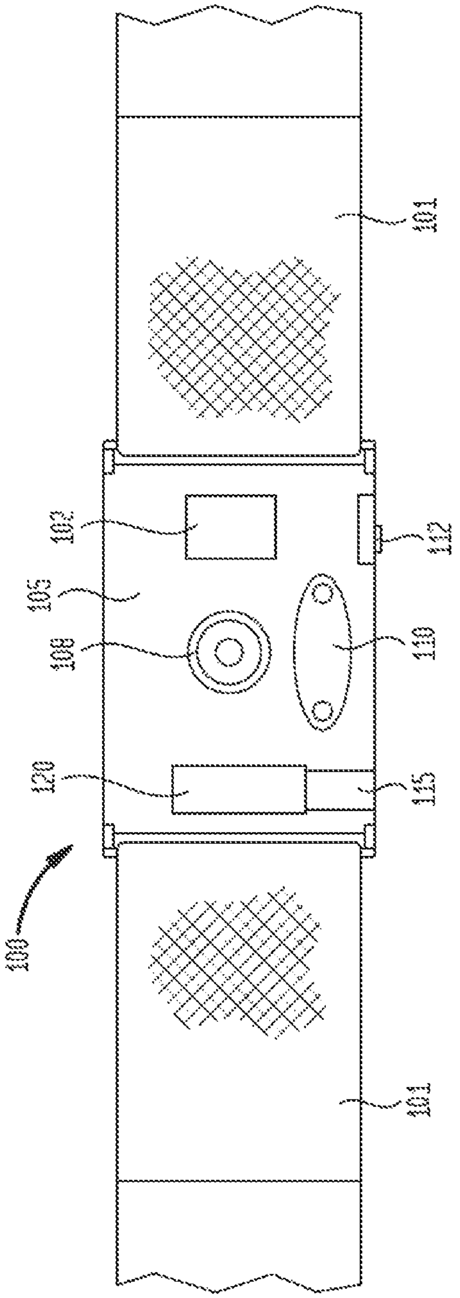

FIG. 22 shows a top view of one wearable or portable embodiment of a system 100, which comprises band 101, vibration device 105 having vibration signal generator 108 attached or affixed thereto or therein, processor, microprocessor, ASIC, controller, CPU or computer 102, on/off switch or user input 112, primary or rechargeable battery or power source 120, USB port 115, and feedback sensor(s) 110. A USB cable can be attached to device 105 by a user through port 115 to charge power source 120. CPU 102 preferably comprises at least one memory for storing one or more programs that are configured to permit CPU 102 to control, activate, and deactivate vibration signal generator 108 in accordance with one or more vibration signal regimes. Such programs may be loaded or stored in a non-volatile memory of CPU 102, either when the CPU is manufactured, or by downloading appropriate instructions, programs or applications to device 105 form an external source, such as a computer or the internet. Vibration signal generator 108 can be any one of a motor, a speaker, an electromechanical transducer or solenoid, a piezoelectric element or array of piezoelectric elements, or any other device that is capable of generating vibration signals that can then be provided to a patient. Feedback sensor(s) 110 may be any one or more of a cardiac monitor, a heart rate monitor, a respiration rate monitor, a galvanic skin response monitor, a temperature sensor, a muscle stiffness or fatigue sensor, or any other type of sensor that can be operably coupled to the patient, and that can provide useful feedback control information to CPU 102 in device 105. CPU 102 can be configured to receive sensed signals from sensor(s) 110, and to use information representative of data from such sensors to initiate, adjust, modify and/or terminate the stimulation regime being provided, or to be provided, to the patient by device 105. Sensor(s) 110 can also comprise multiple sensors of the same or different types. According to some embodiments, device 105 may be a stand-alone vibration therapy device, or may be incorporated into a watch, a heart rate monitor, a mobile phone, or any other suitable portable electronic device.

Figure 23:
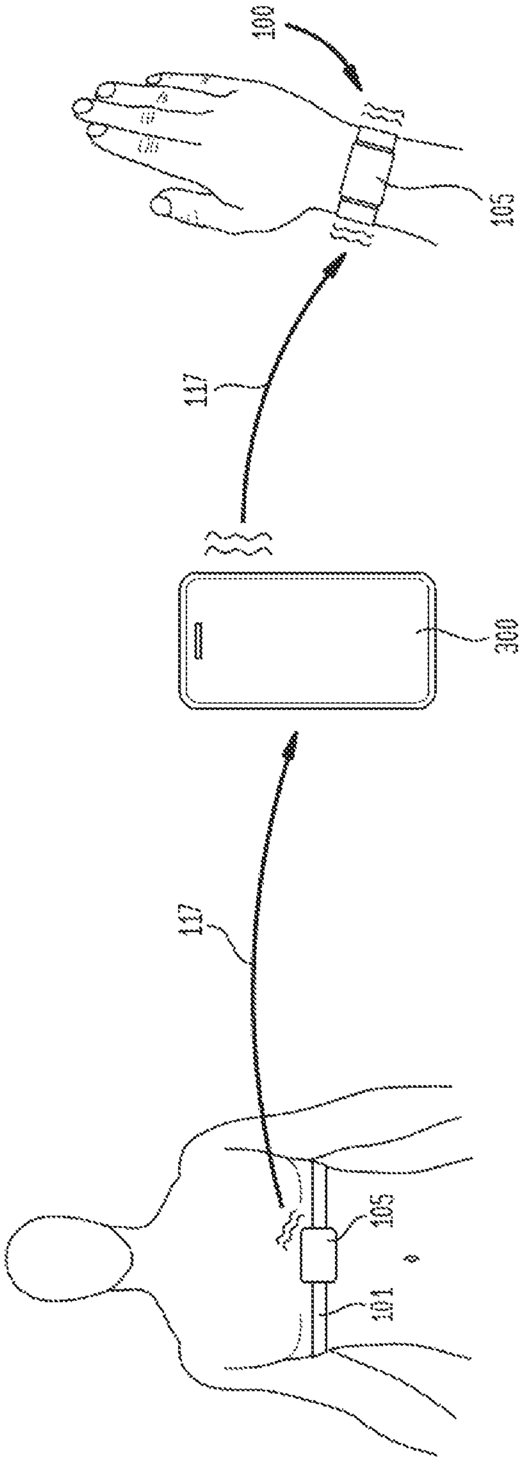

FIG. 23 shows various embodiments of system 100 described above in connection with FIG. 17, where sensor(s) 110 are included in system 100/device 105. Computer 400 (not shown in FIG. 18) and/or mobile electronic device 300 is configured to communicate wirelessly with system 100/device 105 and thereby effect provision of a desired or adjusted vibration signal regime to a patient. Laptop or other computer 400, or mobile electronic device 300, is appropriately programmed with a suitable program or application to provide the desired vibration signal regime to the patient, or to modify a program operating or loaded in the CPU of device 105, on the basis of information, signals or data received from sensor(s) 110 that have been processed by internal CPU 102 of device 105, or that have been processed and analyzed by mobile phone 300 or computer 400.

Figure 24:
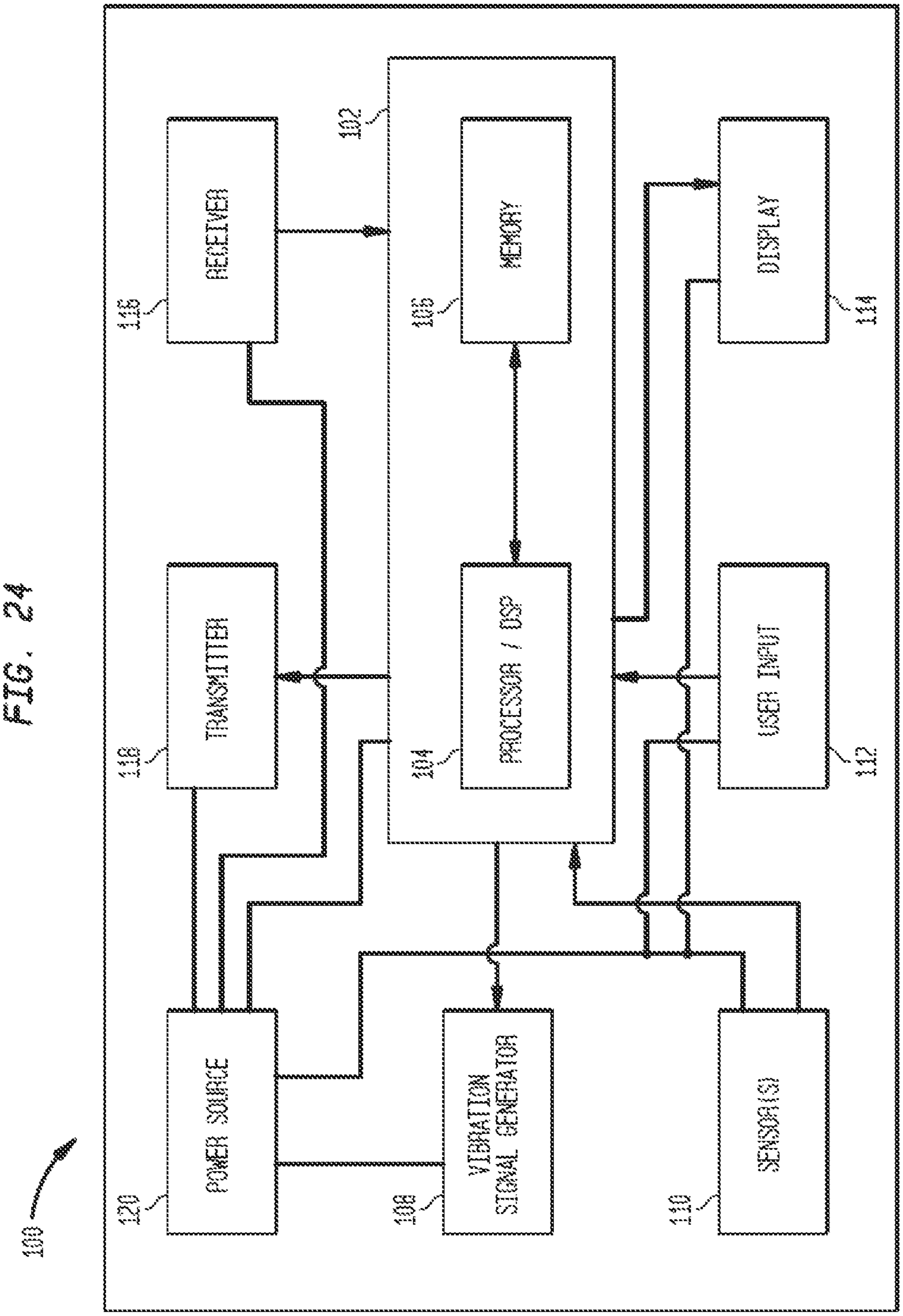

FIG. 24 shows one embodiment of system 100 described and disclosed above. Internal CPU 102 comprises a processor or DSP 104 and a memory 106, and is operably coupled or connected to power source 120, transmitter 118, receiver 116, vibration signal generator 108, sensor(s) 110, user input 112, and display 114. Note that various components shown in FIGS. 19 through 24 may be eliminated or not included in system 100, such as display 114, sensor(s) 110, receiver 116 and transmitter 118. Sensor(s) 110 may be any of the sensors described above. CPU 102 may be configured to adjust the frequency or amplitude of the vibration signal, or change the length of the first period or the second period, on the basis of sensed information.

Note further that various components illustrated in FIGS. 19 through 24 may be distributed in physically different devices. For example, sensor(s) 102 may be separate from the device in which is housed CPU 102 and power source 120. Also by way of example, a mobile phone 300 may be configured as a master to operate CPU 102 as a slave via wireless (e.g., BLUETOOTH) or wired communication therewith. Signal generator may be a pair of headphones or ear buds that are separate from the device housing CPU 102 and power source 120. Note still further that system 100 may comprise a stationary device, such as a chair, an exercise machine, a couch, an automobile seat, a steering wheel, a bed or a mattress. Power source 120 may be a battery (as described above) or may be household ac power provided by inductive or hard-wired means to system 100. In system 100, any one or more of vibration signal generator 108, processor or CPU 102, and power source 120 may be included in a stationary device, or in a wearable or portable device. The wearable or portable device may comprise a band, a watch, a mobile phone, a PDA, or a mobile computing device.

Referring still to FIGS. 19 through 24, system 100 is configured to provide vibration stimulation therapy to a patient and according to some embodiments comprises vibration signal generator 108, and a processor or CPU 102 operably connected to vibration signal generator 108, where the processor is configured to drive, or cause to drive, vibration signal generator 108 in accordance with vibration signal parameters provided to or calculated by processor 102, or stored or programmed in memory 106 forming a portion of or operably connected to the processor 102. At least one power source 120 is operably connected to vibration signal generator 108 and processor, power source 120 being configured to provide electrical power to processor 102 and vibration signal generator 108. In some embodiments, electrical power is provided to vibration signal generator 108 by a different or external power source. System 100 is configured to deliver at least one vibration signal to at least one location on the patient's skin, or through clothing or a layer disposed next to the patient's skin, through vibration signal generator 108. The vibration signal is successively delivered to the patient by system 100 over first periods of time and is not delivered to the patient by system 100 over second periods of time, the second periods of time being interposed between the first periods of time, the at least one vibration signal and the first and second periods of time together being configured to trigger or induce resonance or high amplitude oscillations in a cardiovascular system of the patient. CPU 102 may also be configured to terminate delivery of the vibration signal to the patient on the basis of the sensed information, or to initiate delivery of the vibration signal to the patient on the basis of the sensed information. Vibration signal generator 108 may be one or more headphones, ear buds, speakers, piezoelectric elements, electromagnetic transducers or solenoids, or vibration motors. User input device 112 may be a simple on/off switch, or may comprise buttons, wheels or keys configured to permit the patient to adjust the frequency, amplitude or phase of the vibration signal, or to change the length of the first period or the second period.

In other embodiments, and continuing to refer to FIGS. 19 through 24, system 100 is configured to provide vibration stimulation therapy to a patient and comprises vibration signal generator 108, and processor or CPU 102 operably connected to vibration signal generator 108, where processor 102 is configured to drive, or cause to drive, vibration signal generator 108 in accordance with a vibration signal regime transmitted to or received by processor 102, or stored or programmed in a memory forming a portion of or operably connected to processor 102. At least one power source 120 is operably connected to vibration signal generator 108 and processor 102, power source 120 being configured to provide electrical power to processor 102 and vibration signal generator 108. System 100 is configured to deliver first and second vibration signals successively to at least one location on the patient's skin, or through clothing or a layer disposed next to the patient's skin, through the vibration signal generator. The first and second vibration signals correspond to first and second vibration modes, respectively, and the first vibration mode and first vibration signals correspond to first periods of time, and the second vibration mode and second vibration signals correspond to second periods of time. The second periods of time are interposed between the first periods of time. The first vibration signal is different from the second vibration signal. The first and second vibration signals, the first and second vibration modes, and the first and second periods of time are together configured to trigger or induce resonance or high amplitude oscillations in a cardiovascular system of the patient.

Referring now to all the Figures, it is to be noted that CPU 102 in system 100 is configured to perform the methods described above and in the Figures. System 100, device 105, portable device 300, and/or computer 400 can further comprise a data source/storage device that includes a data storage device, computer memory, and/or a computer readable medium (e.g., memory 106 in FIG. 21). System 100, device 105, portable device 300, and/or computer 400 can be configured to store, by way of example, programs or instructions that are configured to effect the vibration stimulation therapies described herein, and/or to store sensed physiological data. Data from memory 106, portable device 300, computer 400, and/or device 105 may be made available to processor 102, or any other processor in one such devices. Processor 102 may be, by way of example, a programmable general purpose computer, a controller, a CPU, a microprocessor, a plurality of processors, or any other suitable processor(s) or digital signal processors (DSPs). Processor 102 is programmed with instructions corresponding to at least one of the various methods described herein such that the methods or modules are executable by processor 102.

Low-amplitude signals are signals that have substantially or significantly lower amplitudes than those of signals having peak amplitudes delivered to a patient using the devices, systems and methods described herein. By way of non-limiting example, a low-amplitude signal may be a signal having an amplitude(s) that is one or more of a quarter-order of magnitude, a half-order of magnitude, one order of magnitude, two orders of magnitude, or three orders of magnitude smaller than the amplitude(s) corresponding to a peak amplitude signal.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A method of providing stimulation therapy to a patient, the method comprising:
- determining, using a device that includes a processor and a signal generator, an approximated resonance frequency corresponding to one of a plurality of resonance frequencies of a cardiovascular system associated with the patient;
- determining, using the processor, parameters for at least one vibration stimulation signal based on the approximated resonance frequency of the cardiovascular system associated with the patient; and
- inducing the approximated resonance frequency in the cardiovascular system associated with the patient by successively delivering, by the signal generator, a vibration stimulation signal having the determined parameters to the patient.

2. The method of claim 1, wherein the approximated resonance frequency corresponds to one of a plurality of resonance frequencies including one or more of heart rate, blood pressure, and vascular tone of the cardiovascular system associated with the patient.

3. The method of claim 1, wherein a vibration frequency of the vibration stimulation signal is modified until the approximated resonance frequency is reached.

4. The method of claim 3, wherein the vibration frequency of the vibration stimulation signal increases from a frequency greater than about 0.01 Hz to the approximated resonance frequency.

5. The method of claim 3, wherein the vibration frequency of the vibration stimulation signal decreases from a frequency less than about 0.4 Hz to the approximated resonance frequency.

6. The method of claim 1, wherein a vibration frequency of the vibration stimulation signal is modified to begin at the approximated resonance frequency and to increase until the vibration frequency is less than about 0.4 Hz.

7. The method of claim 1, wherein a vibration frequency of the vibration stimulation signal is modified to begin at the approximated resonance frequency and to decrease until the vibration frequency is greater than about 0.01 Hz.

8. The method of claim 1, wherein a vibration frequency of the vibration stimulation signal varies between about 0 Hz to about 400 Hz.

9. The method of claim 1, wherein an amplitude of the vibration stimulation signal varies between about 0.01 G to about 5 G.

10. The method of claim 1, wherein the parameters include a first time period associated with a first type of vibration stimulation signal and a second time period associated with a second type of vibration stimulation signal and wherein a third period that is equivalent to a combination of the first time period and the second time period and that is also equivalent to the approximated resonance frequency of the cardiovascular system of the patient.

11. The method of claim 10, wherein the vibration stimulation signal includes the first type of the vibration stimulation signal being successively delivered to the patient over the first time period and the second type of the vibration stimulation signal being delivered to the patient over the second time period, the second time period being interposed between instances of the first time period.

12. The method of claim 11, wherein the first type of the vibration stimulation signal varies over the first time period.

13. The method of claim 11, wherein a vibration frequency of the vibration stimulation signal varies over the first time period.

14. The method of claim 11, wherein the second type of the vibration stimulation signal varies over the second time period.

15. The method of claim 11, wherein a vibration frequency of the vibration stimulation signal varies over the second time period.

16. The method of claim 11, wherein the first type of the vibration stimulation signal corresponds to an active mode in which the vibration stimulation signal is delivered to the patient over the first time period and wherein the second type of the vibration stimulation signal corresponds to an inactive mode in which the vibration stimulation signal is inhibited from being delivered to the patient over the second time period.

17. The method of claim 11, wherein the first type of the vibration stimulation signal has an increasing frequency vibration that is delivered to the patient over the first time period, and wherein the second type of the vibration stimulation signal has a decreasing frequency vibration that is delivered to the patient over the second time period.

18. The method of claim 11, wherein the first time period is adjacent to the second time period.

19. The method of claim 1, wherein the approximated resonance frequency in the cardiovascular system associated with the patient is triggered by a plurality of sensors.

* * * * *